United States Patent
Zhou et al.

(10) Patent No.: US 12,000,917 B2
(45) Date of Patent: Jun. 4, 2024

(54) METHODS FOR PRODUCING MAGNETIC RESONANCE IMAGES WITH SUB-MILLISECOND TEMPORAL RESOLUTION

(71) Applicant: The Board of Trustees of the University of Illinois, Urbana, IL (US)

(72) Inventors: Xiaohong Joe Zhou, Chicago, IL (US); Zheng Zhong, Chicago, IL (US); Meryem Muge Karaman, Chicago, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 242 days.

(21) Appl. No.: 17/423,729

(22) PCT Filed: Jan. 21, 2020

(86) PCT No.: PCT/US2020/014345
§ 371 (c)(1),
(2) Date: Jul. 16, 2021

(87) PCT Pub. No.: WO2020/150726
PCT Pub. Date: Jul. 23, 2020

(65) Prior Publication Data
US 2022/0065962 A1    Mar. 3, 2022

Related U.S. Application Data

(60) Provisional application No. 62/794,326, filed on Jan. 18, 2019.

(51) Int. Cl.
G01V 3/00 (2006.01)
G01R 33/48 (2006.01)
(Continued)

(52) U.S. Cl.
CPC ..... G01R 33/4824 (2013.01); G01R 33/5608 (2013.01); G01R 33/5611 (2013.01);
(Continued)

(58) Field of Classification Search
CPC ............. G01R 33/3415; G01R 33/543; G01R 33/5659; G01R 33/36; A61B 5/055
(Continued)

(56) References Cited

U.S. PATENT DOCUMENTS 5,864,233 A    1/1999  Zhou
8,379,957 B2   2/2013  Slabaugh et al.
(Continued)

FOREIGN PATENT DOCUMENTS

CN    106028918 A  * 10/2016  ........... A61B 5/0024
DE    102007015040 B3  * 10/2008  ......... G01R 33/5611
(Continued)

OTHER PUBLICATIONS

Feinberg DA, Setsompop K. Ultra-fast MRI of the human brain with simultaneous multi-slice imaging. J Magn Reson. 2013;229:90-100.
(Continued)

*Primary Examiner* — Walter L Lindsay, Jr.
*Assistant Examiner* — Frederick Wenderoth
(74) *Attorney, Agent, or Firm* — Thomas | Horstemeyer, LLP

(57) ABSTRACT

A system and method for producing a series of time-resolved magnetic resonance (MR) images is set forth. The system can perform method steps of encoding spatial information into an MRI signal by manipulating a phase of the MRI signal within an MRI system, generating and outputting a phase-encoded MRI signal over time by digitizing a plurality of time points in the MRI signal, repeating the generating and outputting step for a plurality of phase-encoded signals, each phase-encoded signal in synchrony with a trigger,
(Continued)

producing a plurality of digitized time points, and reconstructing a series of time resolved MR images, each image of the series of MR images at one specific time point selected from the plurality of digitized time points for each phase-encoded step. Each image in the series of time-resolved MR images corresponding to a specific time point in a cyclic event.

20 Claims, 19 Drawing Sheets

(51) Int. Cl.
*G01R 33/56* (2006.01)
*G01R 33/561* (2006.01)
*G01R 33/567* (2006.01)
*G06F 7/58* (2006.01)
*H04L 9/06* (2006.01)
*H04L 9/32* (2006.01)
*H04L 9/00* (2022.01)

(52) U.S. Cl.
CPC ..... *G01R 33/5616* (2013.01); *G01R 33/5673* (2013.01); *G06F 7/588* (2013.01); *H04L 9/0662* (2013.01); *H04L 9/3239* (2013.01); *H04L 9/3247* (2013.01); *H04L 9/50* (2022.05)

(58) Field of Classification Search
USPC ......................................................... 324/309
See application file for complete search history.

(56) References Cited

U.S. PATENT DOCUMENTS

| | | | |
|---|---|---|---|
| 8,577,441 B2* | 11/2013 | Lorenz ...................... | G06T 7/12 600/410 |
| 10,136,834 B2 | 11/2018 | Park et al. | |
| 2002/0171422 A1 | 11/2002 | King | |
| 2003/0036693 A1* | 2/2003 | Avinash ................ | A61B 6/5217 600/413 |
| 2010/0268066 A1* | 10/2010 | Rehwald ............ | G01R 33/5676 600/419 |
| 2011/0254548 A1 | 10/2011 | Setsompop | |
| 2011/0260726 A1* | 10/2011 | Techavipoo ......... | G01R 33/246 324/309 |
| 2013/0182932 A1 | 7/2013 | Chen | |
| 2016/0307301 A1 | 10/2016 | Zhou | |
| 2018/0329009 A1 | 11/2018 | James | |

FOREIGN PATENT DOCUMENTS

| | | | | |
|---|---|---|---|---|
| EP | 2233940 A1 * | 9/2010 | ......... | G01R 33/4616 |
| JP | 3693766 B2 * | 9/2005 | ........... | G01R 33/563 |
| JP | 5976375 B2 * | 8/2016 | | |
| WO | WO-2015181731 A1 * | 12/2015 | ........... | A61B 8/4477 |

OTHER PUBLICATIONS

Griswold, M.A. Jakob, P. M., Heidemann, RM. et al. Generalized autocalibrating partially parallel acquisitions (GRAPPA). Magn. Reson. Med. 47, 1202-1210 (2002).

Jehenson, P., Westphal, M. and Schuff, N. Analytical method for the compensation of eddy-current effects induced by pulsed magnetic field gradients in NMR systems. J Magn. Reson. 1969 90, 264-278 (1990).

Joy, M., Scott, G. and Henkelman, M. In vivo detection of applied electric currents by magnetic resonance imaging. Magn. Reson. Imaging 7, 89-94 (1989).

Konn, D., Gowland, P. and Bowtell, R. MRI detection of weak magnetic fields due to an extended current dipole in a conducting sphere: A model for direct detection of neuronal currents in the brain. Magn. Reson. Med. 50, 40-49 (2003).

Luo, Q., Jiang, X., Chen, 8., Zhu, Y. and Gao, J. H. Modeling neuronal current MRI signal with human neuron. Magn. Reson. Med. 65, 1680-1689 (2011).

Lustig, M., Donoho, D. and Pauly, J. M. Sparse MRI: The application of compressed sensing for rapid MR imaging. Magn. Reson. Med. 58, 1182-1195 (2007).

Niebergall A, Zhang S, Kunay E, et al. Real-time MRI of speaking at a resolution of 33 ms: Undersampled radial FLASH with non-linear inverse reconstruction. Magn Reson Med. 2013;69(2):477-485.

Pipe JG. Motion correction with Propeller MRI: Application to head motion and free-breathing cardiac imaging. Magn Reson Med. 1999;42(5):963-969.

Pruessmann, K. P., Weiger, M., Scheidegger, M. B. and Boesiger, P. Sense: sensitivity encoding for fast MRI. Magn. Reson. Med. 42, 952-962 (1999).

Sanders, J. I. and Kepecs, A. A low-cost programmable pulse generator for physiology and behavior. Front. Neuroengineering 7, (2014).

Sodickson, D. K. and Manning, W. J. Simultaneous acquisition of spatial harmonics (SMASH): Fast imaging with radiofrequency coil arrays. Magn. Reson. Med. 38, 591-603 (1997).

Wright, S. M. and McDougall, M. P. Single echo acquisition MRI using RF encoding. NMR Biomed. 22, 982-993 (2009).

Xiong, J., Fox, P. T. and Gao, J. H. Directly mapping magnetic field effects of neuronal activity by magnetic resonance imaging. Hum. Brain Mapp. 20, 41-49 (2003).

Zhong, et al., "Capturing time-dependent electric currents using MRI with a sub-millisecond temporal resolution", ISMRM 27th Annual meeting and exhibition, May 2019.

Zhong, et al. "MRI wtih sub-millisecond temporal resolution: an example employing spatially resolved eddy current characterization", ISMRM 27th Annual meeting and exhibition, May 2019.

International Search Report for PCT/US20/14345 dated Jun. 9, 2020.

* cited by examiner

METHODS FOR PRODUCING MAGNETIC RESONANCE IMAGES WITH SUB-MILLISECOND TEMPORAL RESOLUTION

CROSS-REFERENCE TO RELATED APPLICATIONS

The present application is a national stage entry pursuant to 35 U.S.C. § 371 of international application No. PCT/US2020/014345, filed on Jan. 21, 2020, that claims the benefit of, and priority to, the filing date of U.S. provisional application Ser. No. 62/794,326, filed on Jan. 18, 2019 and entitled "METHODS FOR PRODUCING MAGNETIC RESONANCE IMAGES WITH SUB-MILLISECOND TEMPORAL RESOLUTION," both of which are hereby incorporated by reference herein in their entireties.

STATEMENT OF GOVERNMENTAL INTEREST

This invention was made with government support under grant number 1S10RR028898 awarded by the National Institutes of Health. The government has certain rights in this invention.

TECHNICAL FIELD

The present disclosure relates to systems and methods configured to generate a series of time-resolved magnetic resonance (MR) images. More specifically, the systems and methods herein generate MR images that capture dynamic processes with sub-millisecond temporal resolution.

BACKGROUND

Increasing the temporal resolution has been a major motivation for magnetic resonance imaging (MRI) technical development. Time-efficient strategies of k-space traversal, coupled with advanced image reconstruction and radiofrequency (RF) coil technologies, have advanced temporal resolution to the order of tens of milliseconds, making it possible to perform real-time imaging to capture many rapid dynamic processes. Despite these exciting developments, a number of important physical and biological processes on a temporal scale of milliseconds or sub-illiseconds remain inaccessible by MRI.

SUMMARY

A method and a system for producing a series of time-resolved MR images are disclosed herein. In one exemplary embodiment, the method includes the steps of encoding spatial information into an MRI signal by manipulating a phase of the MRI signal within an MRI system; generating and outputting a phase-encoded MRI signal over time by digitizing a plurality of time points in the MRI signal; using the MRI system, repeating the generating and outputting step for a plurality of phase-encoded signals, each phase-encoded signal in synchrony with a trigger and each phase-encoded signal incorporating a distinctive or identical phase-encoding value and producing a plurality of digitized time points; and reconstructing a series of time resolved MR images, each image of the series of MR images at one specific time point selected from the plurality of digitized time points for each phase-encoded signal by utilizing the phase-encoded data acquired from the output of the plurality of phase encoded signals, each image in the series of time-resolved MR images corresponding to a specific time point in an event.

In an embodiment the method can include a cyclic event, where the series of time-resolved MRI images span a cycle or a plurality of cycles in the cyclic event.

The cyclic event can be physical, chemical, physiological, or metabolic in nature.

Manipulation of the MRI signal phase can be performed by a phase-encoding gradient pulse or a non-linear gradient applied prior to the acquisition of the MRI signal.

The plurality of digitized time points can be sampled with a constant or variable interval. The interval can range from a few hundreds of nano-seconds to a few milliseconds.

The image reconstruction can be performed by using an inverse Fourier transform or other image reconstruction technique on the plurality of phase-encoded MRI signals, all of which are acquired at the same digitized time point from within each phase-encoded MR signal.

The plurality of phase-encoded signals can be substantially reduced by utilizing parallel imaging reconstruction or compressive sensing image reconstruction.

The series of time resolved MR images can be one-dimensional (1-D), two-dimensional (2-D), or three-dimensional (3-D).

The MRI signal can be a free-induction decay signal, a spin-echo signal, a stimulated echo signal.

The MRI signal can include mathematically complex signal components that can be used as a phase signal, amplitude signal, real signal, or imaginary signal.

An exemplary imaging processing system can include a computational device configured to receive phase-encoded signal data sets from a plurality of phase-encoded MRI signals; and the computational device can be configured to capture and output an image display formed from reconstructing identical time point data contained in and reconstructed from the plurality of phase-encoded MRI signals having an identical time point in a cyclic event.

An imaging processing system associated with an MRI signal generating device of the system can reconstruct an image output from the plurality of MRI signals at time points digitized within a bandwidth selected from a few kHz to a few MHz, if desired, and lasting for a duration from a few millisecond to a few seconds.

The imaging processing system can send or transfer the image display derived from a k-space reconstruction populated with corresponding digitized time points derived from the plurality of phase-encoded MRI signals to a suitable display.

An imaging processing system associated with the MRI imaging system can include a processor configured to receive a number of digitized data points equal to or greater than the number of data points needed to sample an MRI signal. The processor can be configured to display an output computed from the number of digitized data points to incorporate image data containing information from rapid physical or biologic events.

The MRI signal can be modified to capture a longer duration of a dynamic process than needed to sample an MRI signal, in order to produce images of cyclic events over a longer time period.

In accordance with another embodiment, the method can include the steps of: phase encoding spatial information into a magnetic resonance imaging (MRI) signal to produce a phase-encoded MRI signal by manipulating a phase of the MRI signal within an (MRI) system; performing a data acquisition process in the MRI system that samples the phase-encoded MRI signal at N instants in time in each of M data acquisition windows to generate N matrices, each matrix comprising a phase-encoded raw data set that corresponds to a respective point in time on the MRI signal, each raw data set comprising L raw data set points, where M, N and L are positive integers that are greater than or equal to two, each data acquisition window being synchronized to the cyclic event; and processing each of the N phase-encoded raw data sets to produce a series of N reconstructed MR images of the cyclic event.

The method can include displaying the reconstructed image on a display device.

The reconstructed image can have a temporal resolution that is less than or equal to one millisecond.

Each matrix can be a k-space matrix comprising L k-space points.

The MRI signal can be one of a free-induction decay (FID) signal, a spin-echo signal, a stimulated echo signal, a train of FID signals, a train of gradient-echo signals, a train of spin-echo signals and a train of stimulated echo signals.

The temporal resolution can be based on a dwell time, $\Delta t$, of the data acquisition process, and the dwell time is inversely related to a bandwidth, BW, of the MRI system as 1/BW.

The step of processing the phase-encoded raw data sets to produce a reconstructed MR image of the cyclic event can include performing a phase evolution algorithm that processes the phase-encoded images to produce phase maps corresponding to the respective phase-encoded raw data sets and takes differences between the phase maps to obtain a time-resolved phase evolution of the cyclic event.

The cyclic event can be physical, chemical, biological, physiological, or metabolic in nature.

The cyclic event can be, for example, an aortic valve opening and closing.

In accordance with an embodiment, the system for reconstructing an MR image of a cyclic event with high temporal resolution comprises a phase encoder, a data acquisition system and a processor. The phase encoder is configured to phase encode spatial information into an MRI signal to produce a phase-encoded MRI signal by manipulating a phase of the MRI signal, the MRI signal comprising a train of echoes of one of an FID signal, a gradient-echo signal, a spin-echo signal and a stimulated echo signal. The data acquisition system performs an echo-train-based data acquisition process that samples the train of echoes such that each echo in the train of echoes is positioned in a respective time-resolved two-dimensional (2-D) k-space matrix and such that all echoes of the train of echoes are spread across a series of the time-resolved 2-D k-space matrices. The echo-train-based data acquisition process is repeated with different phase-encoding values applied by the phase encoder to the MRI signal until all of the time-resolved 2-D k-space matrices are adequately samples. The processor is configured to process the series of 2-D k-space matrices to produce a reconstructed MR image of the cyclic event with a temporal resolution determined by an inter-echo spacing between two adjacent echoes of the train of echoes.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
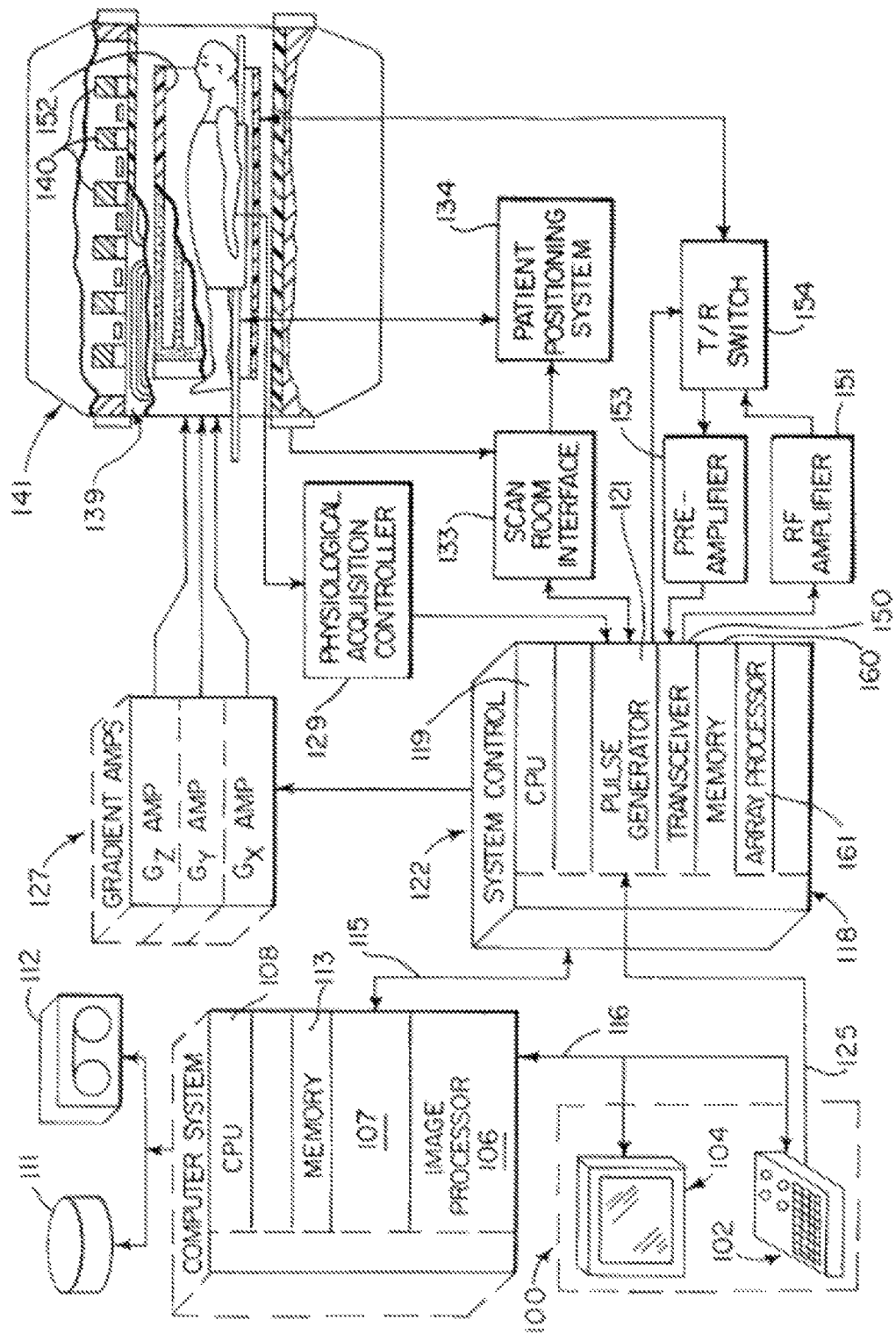
FIG. 1 is a block diagram of an MRI system in accordance with an exemplary embodiment.

In accordance with the inventive principles and concepts of the present disclosure, systems and methods are disclosed for Sub-Millisecond Periodic Event Encoded Dynamic Imaging (SPEEDI) that are capable of capturing cyclic dynamic events with sub-millisecond resolution. Experimental examples of the inventive principles and concepts are disclosed herein. A few representative, or exemplary, embodiments of the systems and methods are described below in detail.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device," as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," as that term is used herein encompasses an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

With reference to FIG. 1, there is shown the major components of an MRI system in accordance with an exemplary embodiment that incorporates the inventive principles and concepts disclosed herein. For completeness, prior to describing the inventive principles and concepts, a general discussion of the MRI system 100 is provided.

The operation of the MRI system is controlled from an operator console 100, which typically includes a keyboard and control panel 102 and a display 104. The console 100 communicates through a link 116 with a separate computer system 107 that enables an operator to control the production and display of images on the display 104. The computer system 107 includes a number of modules that communicate with each other, typically via a backplane. These include an image processor module 106, a CPU module 108 and a memory module 113, known in the art as a frame buffer for storing image data arrays. The computer system 107 is typically linked to external memory, such as a disk storage 111 and other storage 112 such as, for example, a tape drive, cloud-based storage, portable storage media or other suitable memory device, for storage of image data and programs. The computer system 107 communicates with a separate system control 122 through a communication link 115.

The system control 122 includes a set of modules that are in communication with one another, typically via a backplane. These include a CPU module 119 and a pulse generator module 121, which connects to the operator console 100 through a communication link 125. It is through this link 125 that the system control 122 receives commands from the operator that indicate the scan sequence that is to be performed. The pulse generator module 121 instructs the system components to carry out the desired scan operation sequence. It produces data which indicates the timing, strength and shape of the RF pulses that are to be produced, and the timing of and length of the data acquisition window. The pulse generator module 121 connects to a set of gradient amplifiers 127 to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. The pulse generator module 121 connects to a scan room interface circuit 133 that receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to the gradient amplifier system 127 comprising Gx, Gy and Gz amplifiers. Each gradient amplifier excites a corresponding gradient coil in an assembly generally designated 139 to produce the linear magnetic field gradients used for position encoding acquired signals.

The gradient coil assembly 139 forms part of a magnet assembly 141 that includes a polarizing magnet 140 and a whole-body RF coil 152.

A transceiver module 150 in the system control 122 produces pulses that are amplified by an RF amplifier 151 and delivered to the RF coil 152 by a transmit/receive switch 154. The resulting signals emitted by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to transform the data into an array of image data. This image data is conveyed through the serial link 115 to the computer system 107 where it is stored in the disk memory 111. In response to commands received from the operator console 100, this image data may be archived on external drive 112, or it may be further processed by the image processor 106 as will be described in more detail below and conveyed to the operator console 100 and presented on the display 104.

As indicated above, in accordance with the inventive principles and concepts disclosed herein, systems and methods are implemented in an MRI system such as, for example, the MRI system shown in FIG. 1, to perform SPEEDI to reconstruct images with a sub-millisecond temporal resolution. This allows periodic and/or repeatable processes to be captured that current MRI systems are not capable of capturing. The technical feasibility of the system and methods herein can be demonstrated by employing examples. The first example disclosed herein is that of spatially resolved eddy current characterization with short time constants.

The systems and methods disclosed herein are capable of capturing a repeatable and/or cyclic dynamic event during an MR imaging study, such as cardiac motion, neuronal current evolution, and hemodynamic response, for example. Unlike conventional MRI, in which a free induction decay (FID) or a spin-echo signal is used to encode spatial or chemical shift information, SPEEDI uses one of these signals to resolve a dynamic event with a temporal resolution determined by the dwell time. In SPEEDI, spatial localization can be accomplished by the combination of slice-selection and phase-encoding (for 2-D imaging) or by phase encoding exclusively (for 3-D) via a synchronized acquisition with the repeatable and/or cyclic event. In doing so, each point in the FID or spin-echo signal can corresponds to an image, and a collection of all points over the course of an FID or spin-echo signal can be processed to provide a time-resolved description of the repeatable and/or cyclic event, as described below with reference to, for example, FIG. 2. Alternatively, a collection of points acquired via echo-train-based acquisition, i.e., acquired over the course of a train of such signals, can be processed to provide a time-resolved description of the repeatable and/or cyclic event, as described below with reference to, for example, FIG. 14.

With SPEEDI, the temporal resolution of MRI is no longer determined by how fast k-space is traversed (i.e., the scan time or repetition time (TR)), but instead by a preselected dwell time (e.g., 40 µs with a receiver bandwidth of 12.5 kHz). Due to the use of phase-encoding in SPEEDI for spatial encoding, the scan time in SPEEDI can be long. However, this issue can be mitigated by using various techniques that will be discussed below in detail, such as, for example, advanced k-space sampling techniques (e.g., compressive sensing (CS)), reduced field of view (FOV), echo-train acquisition, decreased image matrix size, etc.

Assuming the systems and methods are implemented in the MRI system shown in FIG. 1, the phase-encoding algorithm of SPEEDI may be performed by pulse generator 121. To perform the phase-encoding operation, a processor of the pulse generator 121 causes it to generate a pulse to drive the gradient amplifiers 127 Gx, Gy, and/or Gz. Typically, Gy is the phase-encoding gradient, but in the context of the present disclosure, any one, any two, or all three gradients (Gx, Gy and Gz) can be the phase-encoding gradient(s) that performs phase-encoding of an MRI signal. It should be noted, however, that the inventive principles and concepts are not limited with regard to where or which component in the MRI system performs the phase-encoding operation of SPEEDI.

Another aspect of the present disclosure is the sampling algorithm of the SPEEDI. As will be described below in detail, the data acquisition window is synchronized with the cyclic or repetitive event that is to be imaged with sub-millisecond resolution. The sampling algorithm may also be performed by a processor of the pulse generator 121 of the MRI system shown in FIG. 1, or other suitable MRI data processor configured to receive and process MRI data.

In accordance with principles of the present disclosure, the phase evolution algorithm of SPEEDI can be performed by the MRI data processor and/or the MRI system. The phase evolution algorithm processes the reconstructed images to obtain phase maps of MR images and takes the difference between the phase map MR images. These phase map differences provide an indication of the phase evolution of the cyclic or repetitive event that provides a characterization of the cyclic or repetitive event with sub-millisecond resolution. The phase evolution algorithm may be performed by, for example, the image processor 106 of the MRI system shown in FIG. 1, although the inventive principles and concepts are not limited with regard to where or which component in the MRI system performs the phase evolution algorithm of SPEEDI.

Figure 2:
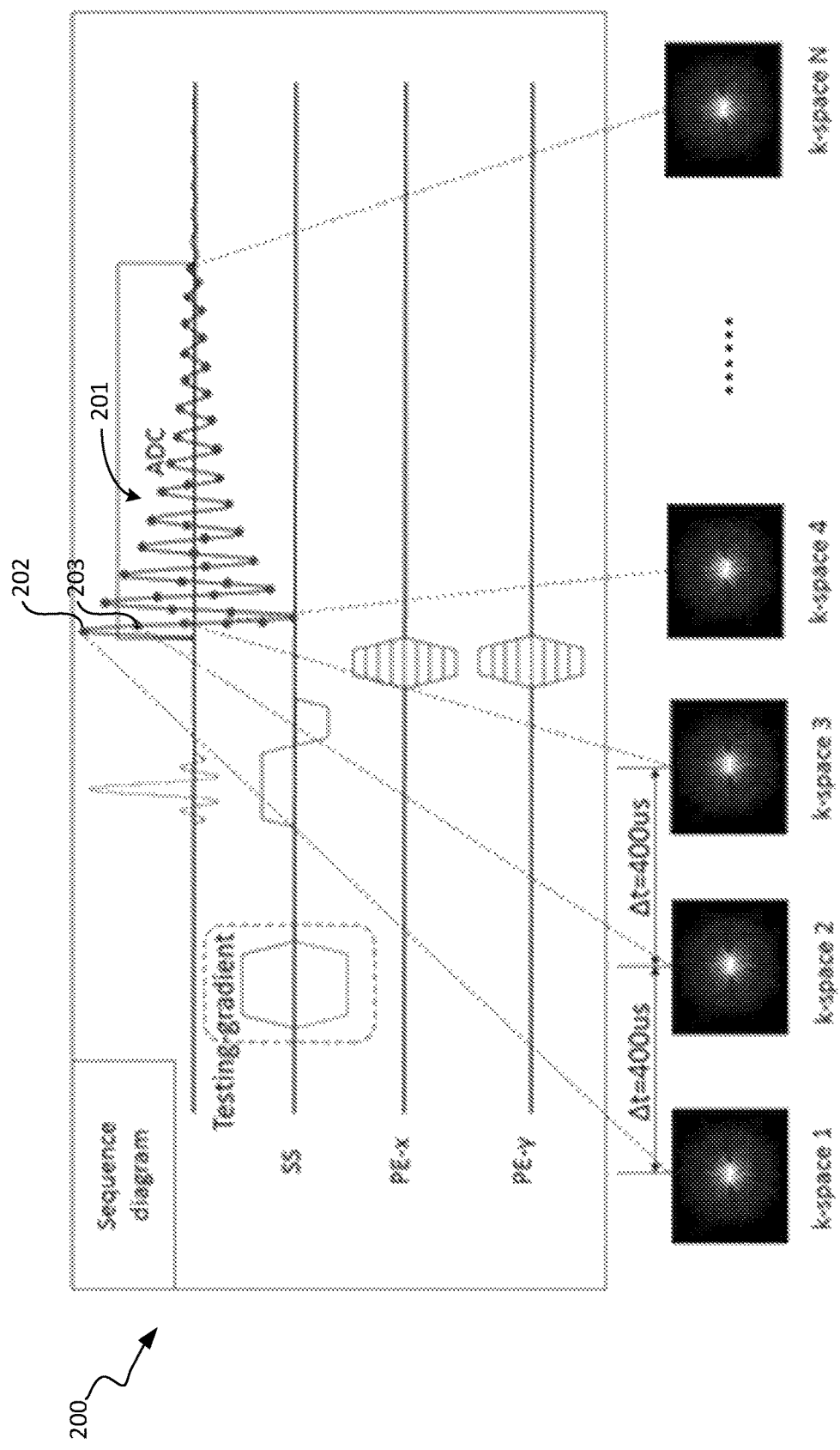
FIG. 2 illustrates an exemplary embodiment of a sequence diagram used for measuring short time constant eddy currents.

As a first example of the manner in which SPEEDI can be applied to characterize a cyclic event, SPEEDI is applied to characterizing eddy currents on a 3T commercial MRI scanner. FIG. 2 illustrates sequence diagram that represents measuring short time constant eddy currents in accordance with an exemplary embodiment in which the phase-encoding algorithm of SPEEDI performs phase encoding (PE) in the x- and y-directions (PE-x and PE-y), respectively. The short time constant ($\tau$) of eddy currents are difficult to measure because a temporal resolution of sub-millisecond or higher is typically required. SPEEDI can uniquely meet this challenge. Using SPEEDI, a pulse sequence can be designed for characterizing the B0 magnetic field and cross-term eddy currents with short time constants. The pulse sequence can be applied twice with the opposite testing gradient polarities. The phase difference between the two acquisitions can be expressed by Eq. 1 as:

$$\varphi(t) = \frac{\varphi_1(t) - \varphi_2(t)}{2} = \gamma \int_0^t B_e(\vec{x}, t') dt'. \quad [1]$$

The fast-changing phase evolution caused by eddy currents can be measured using the SPEEDI sequence illustrated in FIG. 2. In accordance with this embodiment, the cyclic event is represented by an FID signal 201. As indicated above, the SPEEDI sampling algorithm synchronizes the data acquisition window with the cyclic event. The cyclic event is sampled N times over M data acquisition windows to obtain L k-space matrix points, represented in FIG. 2 by k-space 1 through k-space N, where N is a positive integer that is greater than or equal to two. For example, the k-space 1 matrix that represents point 202 on the FID signal 201 is made up of L k-space points obtained by sampling the point 202 on the FID signal 201 over M repetitions of the FID signal 201. Likewise, the k-space 2 matrix that represents point 203 on the FID signal 201 is made up of L k-space points obtained by sampling point 203 on the FID signal 201 over M repetitions of the cyclic event, and so on.

The SPEEDI sequence 200 illustrated in FIG. 2 can be implemented on, for example, a 3T GE MR 750 scanner. The eddy current experiment discussed herein was performed on a spherical water phantom by disabling the manufacturer's eddy current compensation algorithm for the B0-term and cross-terms (i.e., y-to-x, and y-to-z linear eddy currents) to enable eddy current characterization to be performed. The SPEEDI sequence parameters used for the experiment were: repetition time (TR)/echo time (TE)=200/2.8 millisecond (ms), slice thickness=5 millimeters (mm), field of view (FOV)=12 centimeters (cm)×12 cm, matrix size=64×64, bandwidth=±1.25 kilohertz (kHz), number of points=N=256, and the total acquisition time=13.6 minutes using conventional k-space sampling techniques. To reduce the scan time, advanced k-space sampling techniques, such as compressive sensing (CS) sampling techniques can be applied. For example, CS sampling with an acceleration factor of five was applied in a separate experiment without changing any other parameters, resulting in a reduced scan time of 2.7 minutes.

Figure 3:
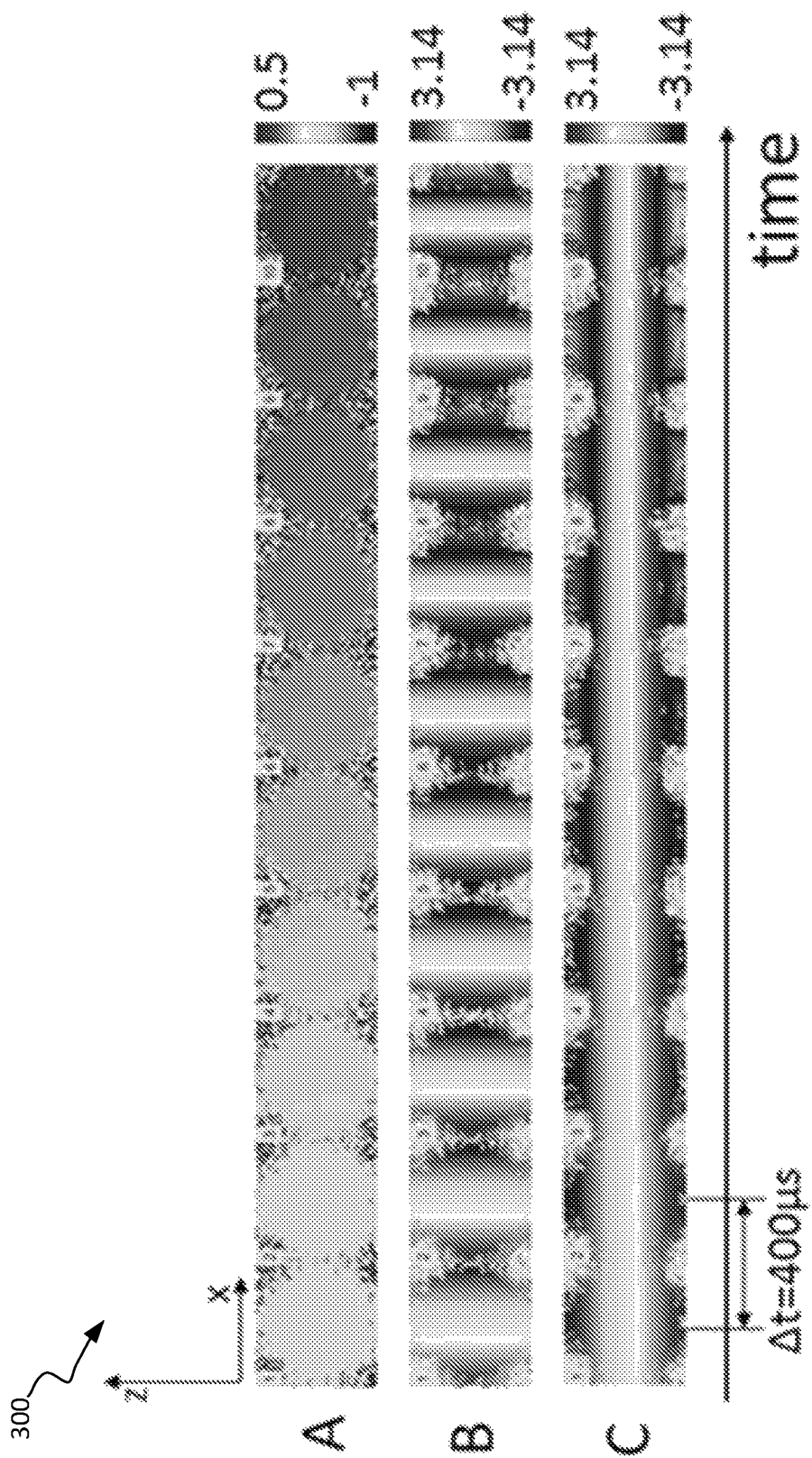
FIG. 3 illustrates an exemplary embodiment of phase difference maps showing the time evolution of BO eddy currents.
Figure 4:
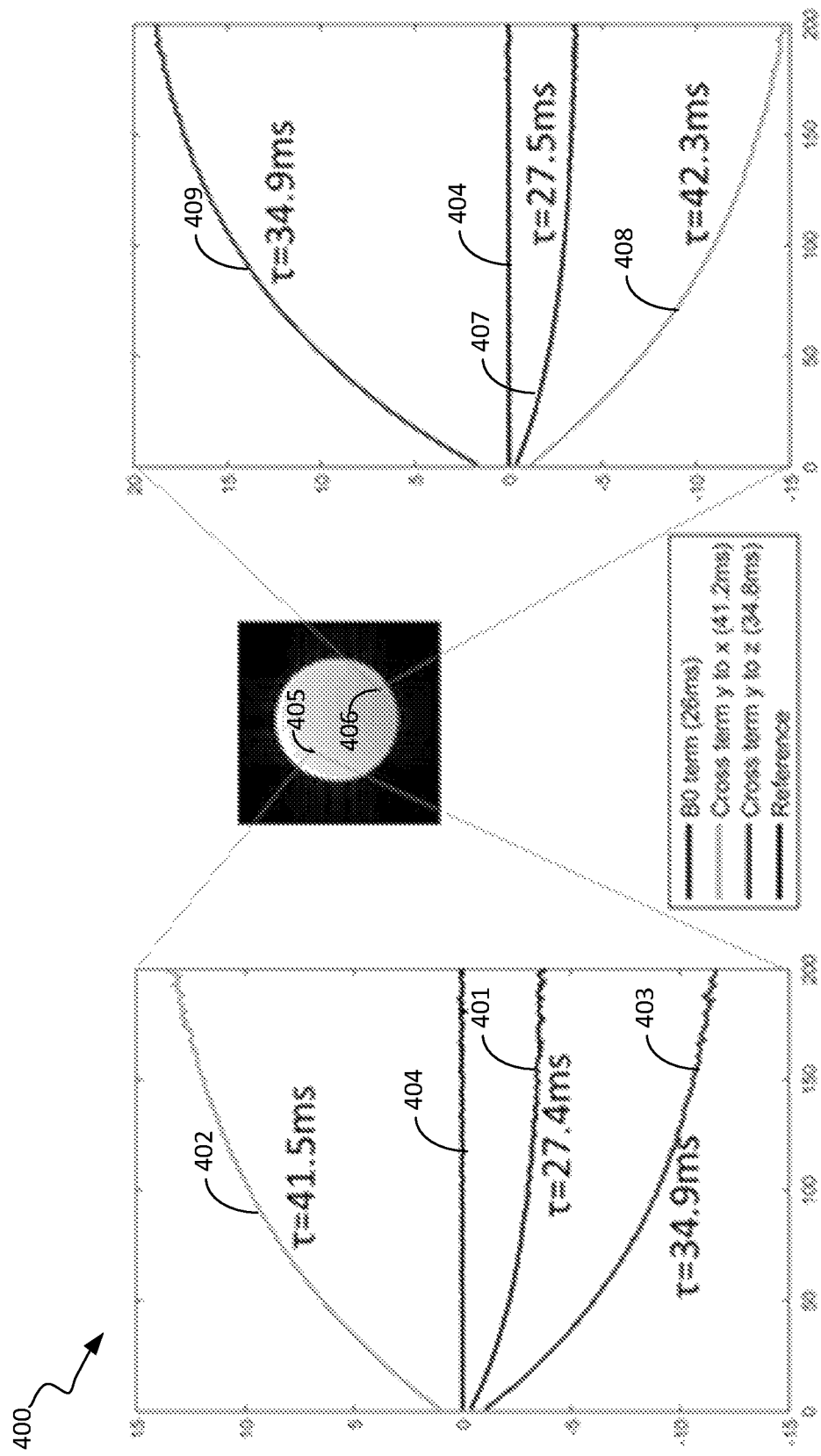
FIG. 4 illustrates an exemplary embodiment of plots of the time-course of phase difference evolution from two randomly selected points in the image.
Figure 5:
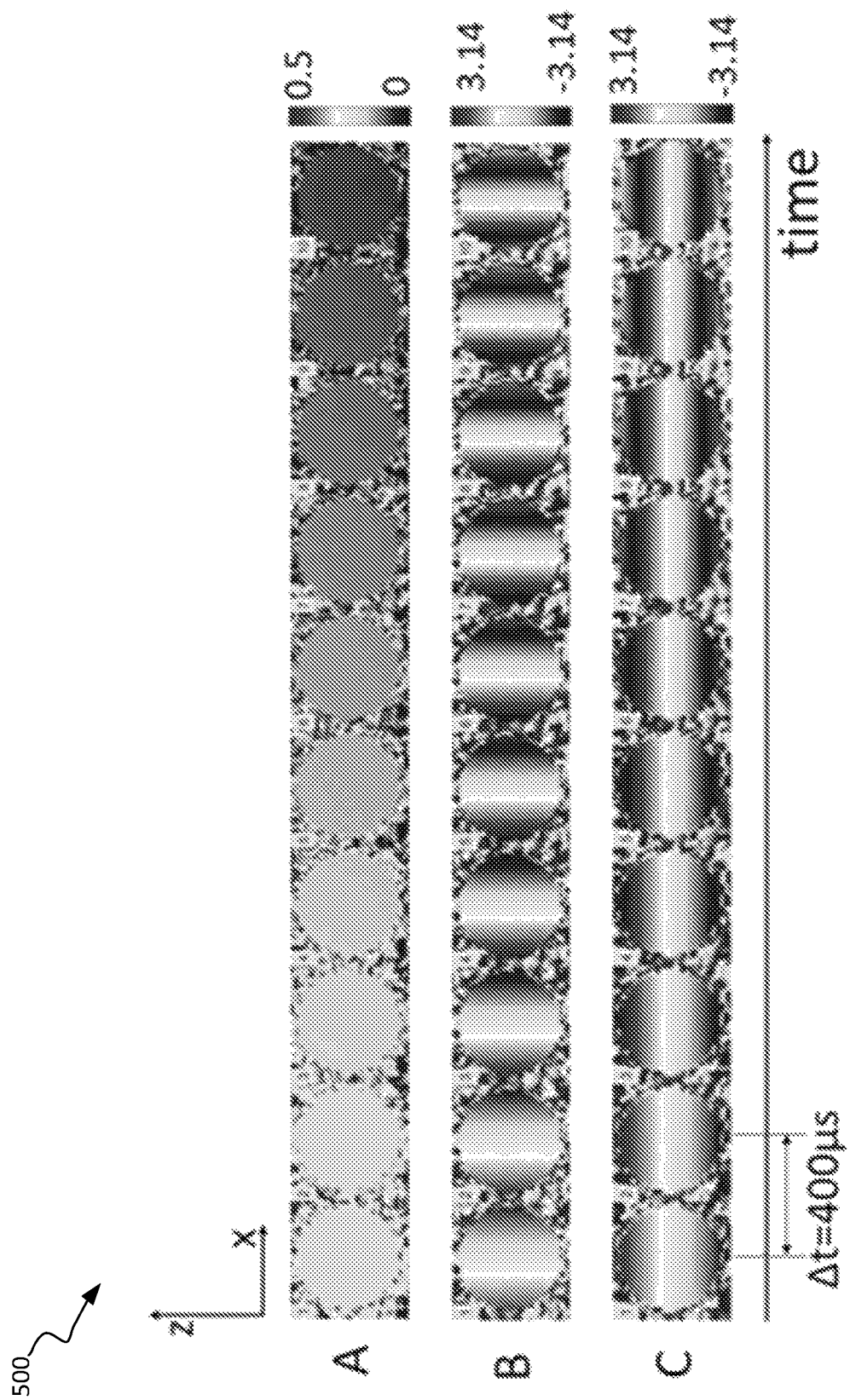
FIG. 5 illustrates an exemplary embodiment of phase difference maps showing a temporal resolution is 400 microseconds ($\mu$s).

The aforementioned phase evolution algorithm was performed to obtain time-resolved phase difference maps by applying Eq. 1. At each pixel, the eddy current time constant can be estimated from the exponential time evolution of the signal phase. Accordingly, three time series of phase maps are shown generally at 300 in FIG. 3, each with a temporal resolution of 400 microseconds (μs). These time series phase maps correspond to the B0 eddy currents (A), y-to-x (B), and y-to-z (C) cross-term eddy currents. The time course evolutions from two randomly selected points in the phase map are displayed generally at 400 in FIG. 4, where the exponential variation is clearly seen. In FIG. 4, curves 401, 402, 403 and 404 correspond to the B0 term, the y-to-x cross term, the y-to-z cross term and the reference, respectively, at pixel 405 and curves 407, 408 and 409 correspond to the B0 term, the y-to-x cross term and the y-to-z cross term, respectively, at pixel 406. The time constants measured at different locations exhibited excellent consistency. The scan time can be reduced, if desired. For example, the phase difference maps from the CS acquisition can show similar results, but with a significantly reduced scan time, as illustrated by the three time series phase maps 500 shown in FIG. 5 for the B0 term eddy currents (A), the y-to-x cross term eddy currents (B) and the y-to-z cross term eddy currents (C).

By characterizing the spatially resolved eddy currents, it is clear that SPEEDI can be employed to capture fast repeatable and/or cyclic event(s) with sub-millisecond temporal resolution. In accordance with the inventive principles and concepts disclosed herein, an even higher temporal resolution can be achieved with a broader receiver bandwidth. Thus, the inventive principles and concepts demonstrated in this specific example directed to eddy currents are generalizable to capturing other fast repeatable and/or cyclic events.

Additionally, neuronal current mapping using MRI can have profound biomedical applications, but thus far has been hampered by limited temporal resolution. Using systems and methods in accordance with the inventive principles concepts of the present disclosure, temporal resolution of MRI can be substantially increased to the sub-millisecond scale or shorter to capture dynamic changes of currents such as neuronal currents, as well as other ultra-fast physical or biological processes that are repeatable and/or cyclic, as will be discussed below in more detail.

Although mapping time-dependent electric currents using MRI was proposed about three decades ago, and has since stimulated considerable interest in capturing neuronal activation associated with brain functions, systems and methods have not been developed heretofore that are capable of capturing neuronal activation during MRI scanning. The ability to capture such events has faced two daunting challenges, namely, a very weak current (nano-ampere) and an ultrafast temporal scale (millisecond) during neuronal activities. Although considerable progress has been made in addressing the first problem, the challenge of temporal resolution has remained formidable. Even with the most advanced k-space traversal strategies, image reconstruction algorithms, and RF coil technologies, the achievable temporal resolution of MRI (i.e., tens of millisecond) reported to date falls short for capturing the rapid current change during neuronal activation. In accordance with the inventive principals and concepts disclosed herein, systems and methods are provided that are capable of capturing repeatable and/or cyclic electric current changes with a sub-millisecond temporal resolution, thereby providing a potential technical solution for mapping neuronal currents and other ultrafast biological processes.

Again, unlike conventional MRI in which an FID or a spin-echo signal is used to encode spatial or chemical shift information, SPEEDI uses such signals to resolve a dynamic event with a temporal resolution determined by the dwell time. As indicated above, in SPEEDI, spatial localization can be accomplished by phase-encoding and/or slice selection only, freeing up the conventional frequency-encoding domain for temporal characterization. As discussed above with reference to FIG. 2, each phase-encoding step is synchronized with the periodicity of a cyclic event, and each point in the FID or spin-echo signal can correspond to an image. A collection of all points over the course of an FID or spin-echo signal can provide a time-resolved characterization of the repeatable and/or cyclic event, as shown generally at 600 in FIG. 6. As indicated above, with SPEEDI, the temporal resolution of MRI is no longer determined by how fast k-space is traversed, but by the dwell time, Δt, or the receiver bandwidth, BW. The dwell time Δt is inversely related to the bandwidth BW (Δt=1/BW).

In accordance with this embodiment, the cyclic event is represented by an FID signal 601. As indicated above, the SPEEDI sampling algorithm synchronizes the data acquisition window, represented in FIG. 6 by acquisition blocks 602, with the cyclic event, represented in FIG. 6 by arrows 603. The cyclic event 603 is sampled N times over M data acquisition windows to obtain L k-space matrix points, represented in FIG. 6 by k-space 1 through k-space N, where M, N and L are all positive integers that are greater than or equal to two. For example, the k-space 1 matrix that represents point 604 on the FID signal 601 is made up of L k-space points obtained by sampling the point 604 on the FID signal 601 over M repetitions of the FID signal 601. Likewise, the k-space 2 matrix that represents point 605 on the FID signal 601 is made up of L k-space points obtained by sampling point 605 on the FID signal 601 over M repetitions of the cyclic event, and so on.

Figure 7B:
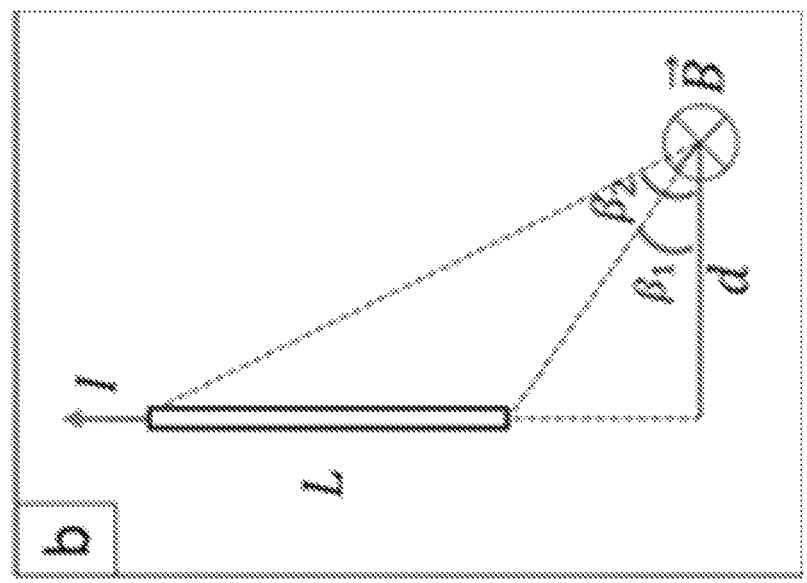
FIG. 7 illustrates an exemplary embodiment of an imaging plane in an experimental study of the principles of the present disclosure.
Figure 7A:
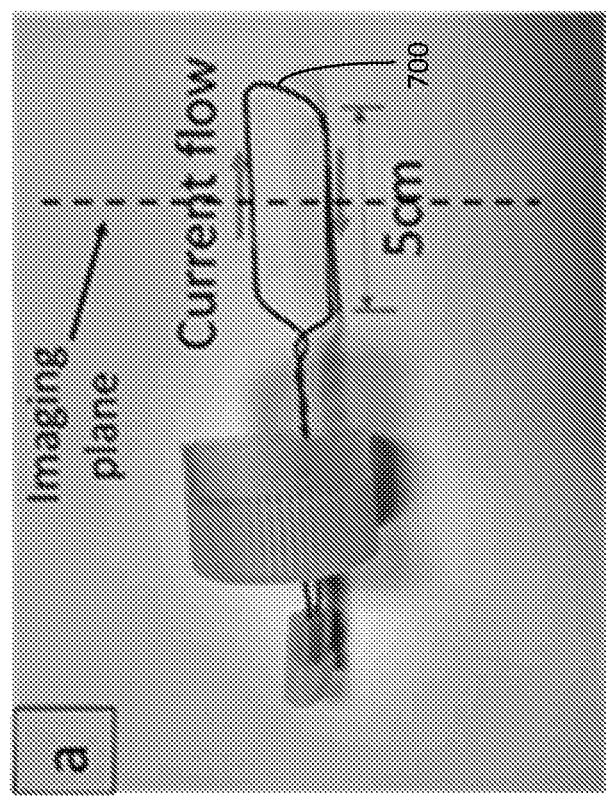

To illustrate the principle of using SPEEDI for characterizing fast-changing electric current, a rectangular wire loop with a length of 5 cm, depicted as 700 in FIG. 7A, was constructed and submerged in a water phantom for the experimental studies. The magnetic field produced by the wire loop can be calculated using the Biot-Savart law given in Eq. 2:

$$B(t) = \int_L dB = \frac{\mu_0 I(t)}{4\pi d}(\sin\beta_2 - \sin\beta_1), \quad (2)$$

where L in this equation is the length of the wire, $\mu_0$ is the magnetic permeability, I is the current, and other geometric parameters are shown in FIG. 7B. With an applied current, a corresponding phase change in the image can be calculated in accordance with Eq. 3:

$$\varphi(t) = \gamma \int_0^t B(t') dt' \quad (3)$$

Figure 8:
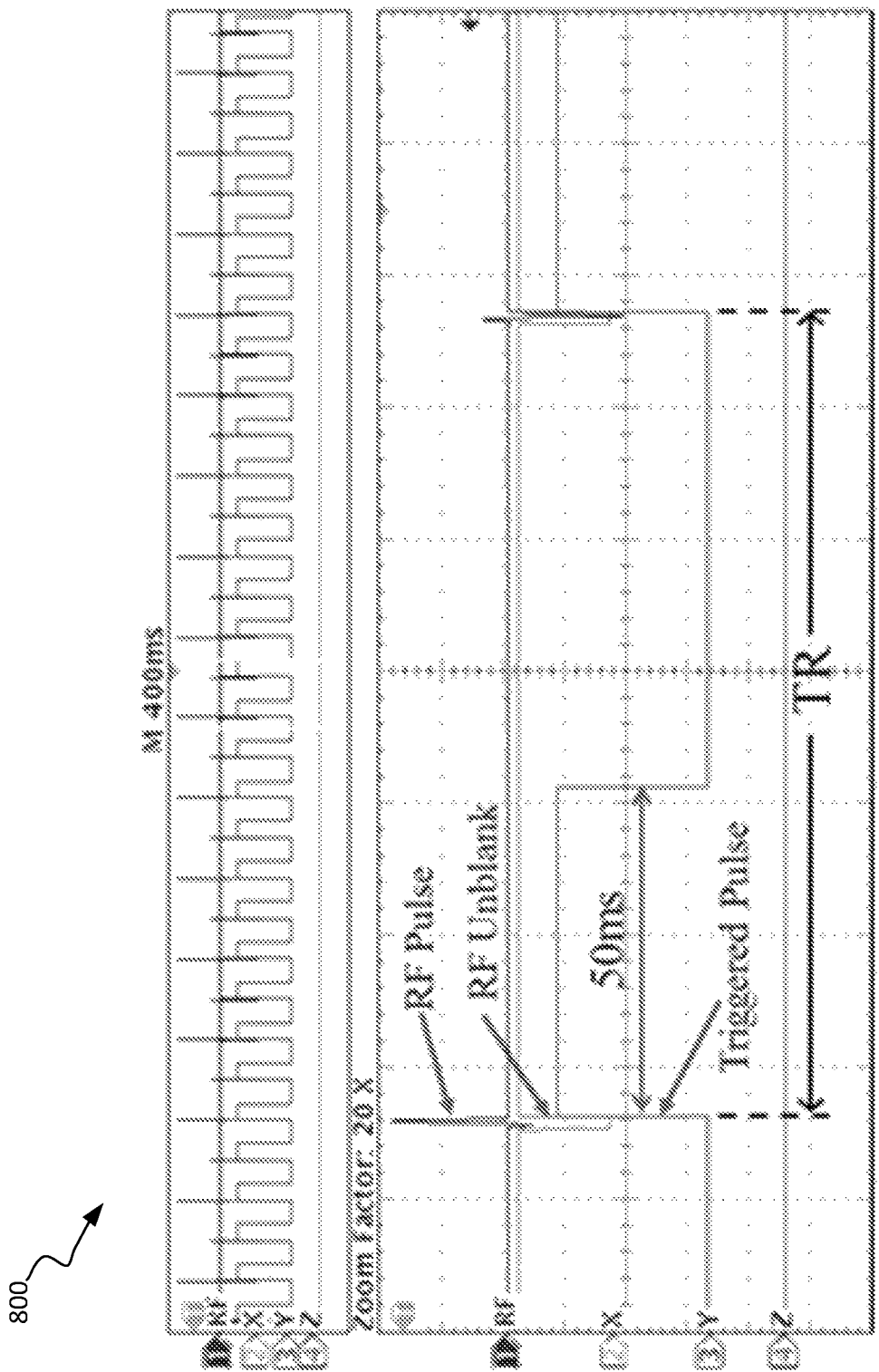
FIG. 8 illustrates an exemplary embodiment of a trigger current signal with an adjustable delay in an experimental model.

A suitable pulse generator, such as PulsePal (Sanworks, Stony Brook, NY), for example, can be used to deliver a current signal to the wire loop in synchrony with a SPEEDI pulse sequence. A number of current wave forms, including a step current waveform, a sine waveform, and a waveform that mimics the shape of action potential, were employed in this study. The RF unblank signal from the scanner can be used as a trigger for synchronization, as illustrated generally at 800 in FIG. 8. In an MRI system such as that shown in FIG. 1 being used to capture a rapid cyclic physiological event using SPEEDI, a processor of the pulse generator 121 that performs the SPEEDI sampling algorithm may receive this trigger signal from the physiological acquisition controller 129. To determine the relationship between the applied current and the phase change, a computer simulation can be performed with a set of parameters identical to those used in the experimental studies described below. Using Eqs. 2 and 3, the simulated images can also establish a benchmark for comparison with experimental images.

A SPEEDI pulse sequence (e.g., FIG. 6) can be implemented on a 3T GE MR750 scanner, followed by experimental studies using the apparatus shown in FIGS. 7A and 7B with the following parameters: TR=122 ms, TE=2.8 ms, slice thickness=3 mm, FOV=8 cm×8 cm, matrix=64×64, bandwidth=±2.5 kHz, number of sampling points=256, scan time=8 min 20 sec. The acquisition can be first performed without current in the wire loop as a reference, followed by another acquisition after applying a 3 mA peak current with a duration of 50 ms. Using Eq. 3, phase maps can be produced by taking the phase difference between the two acquisitions and compared with the simulation results.

Figure 9:
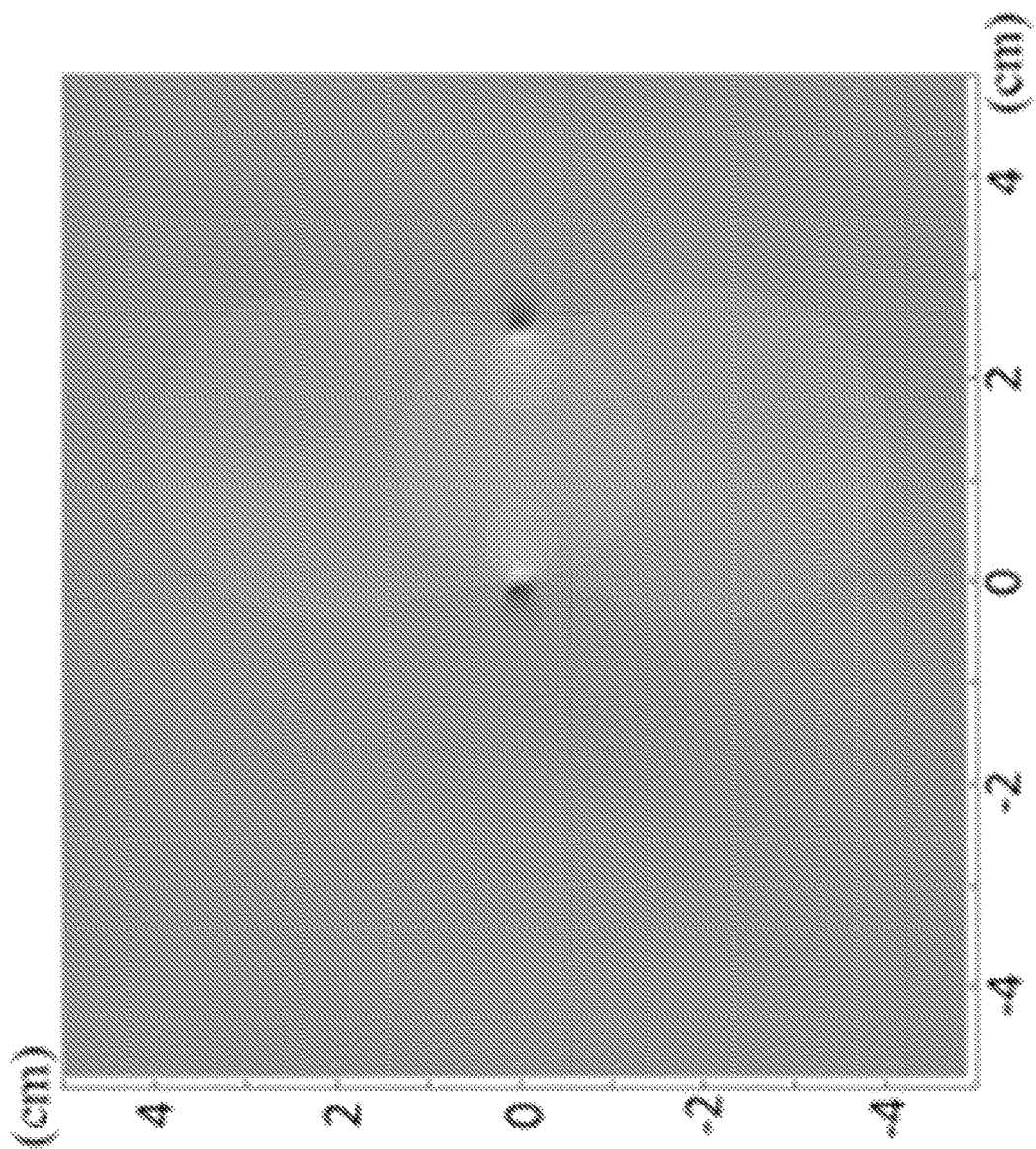
FIG. 9 illustrates an exemplary embodiment of an experimental simulated phase map in accordance with the principles herein.
Figure 10:
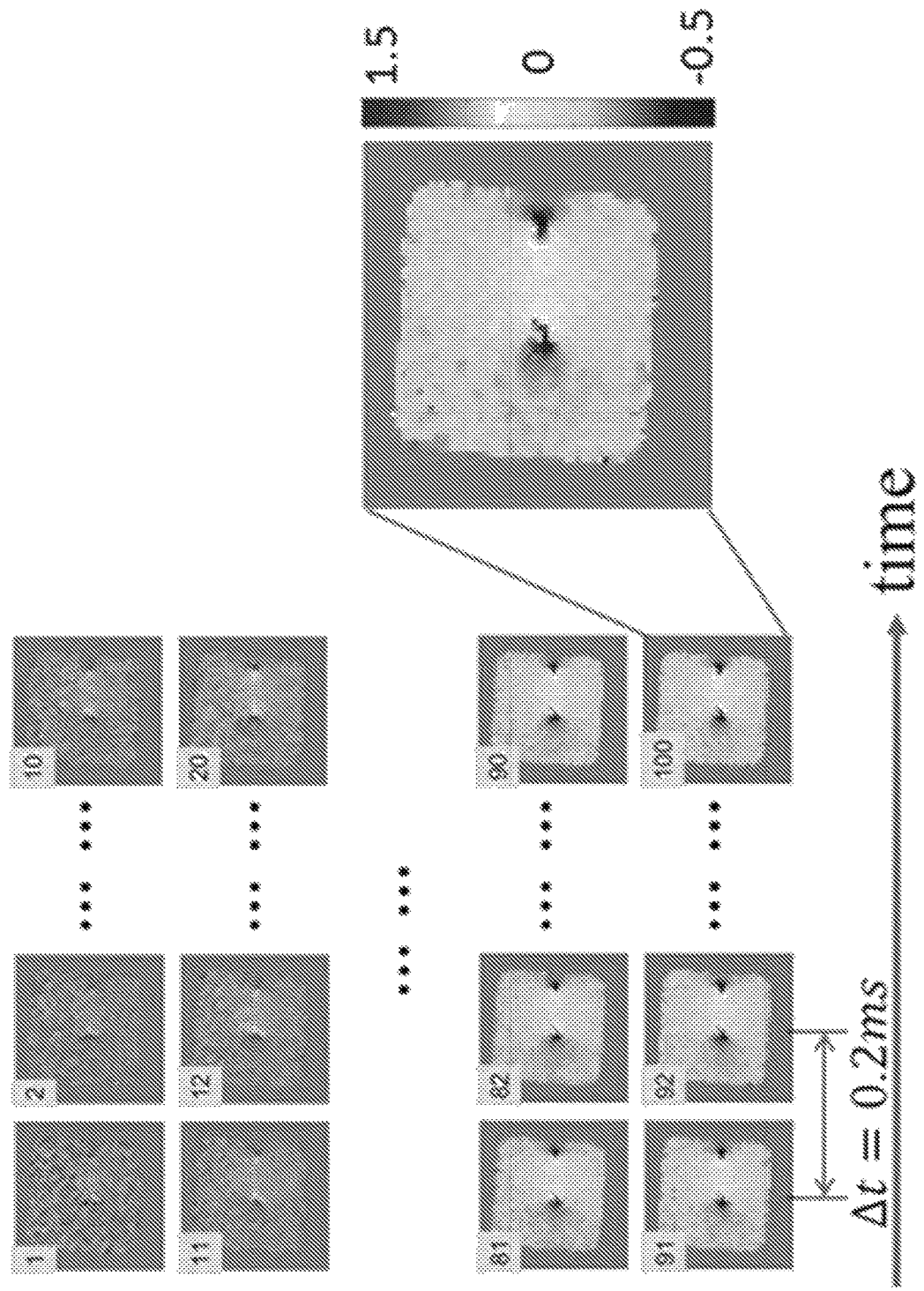
FIG. 10 illustrates an exemplary set of phase difference maps covering a total time span of 20 ms with a temporal resolution of 0.2 milliseconds (ms) in accordance with the principles herein.

FIG. 9 shows a simulated phase image at the middle plane of two parallel wires (FIG. 7A) with a current of 3 mA, where the dipole pattern is clearly visible. For the experimental study, the fast-changing phase maps as a result of the time-varying current waveform in the wire were well captured with a temporal resolution of 0.2 ms, as shown in FIG. 10.

In another example, the experiment and simulation described above were performed, but instead of using conventional acquisition techniques, CS acquisition was used to reduce scan time, as will now be described.

Experimental Setup

Figure 6:
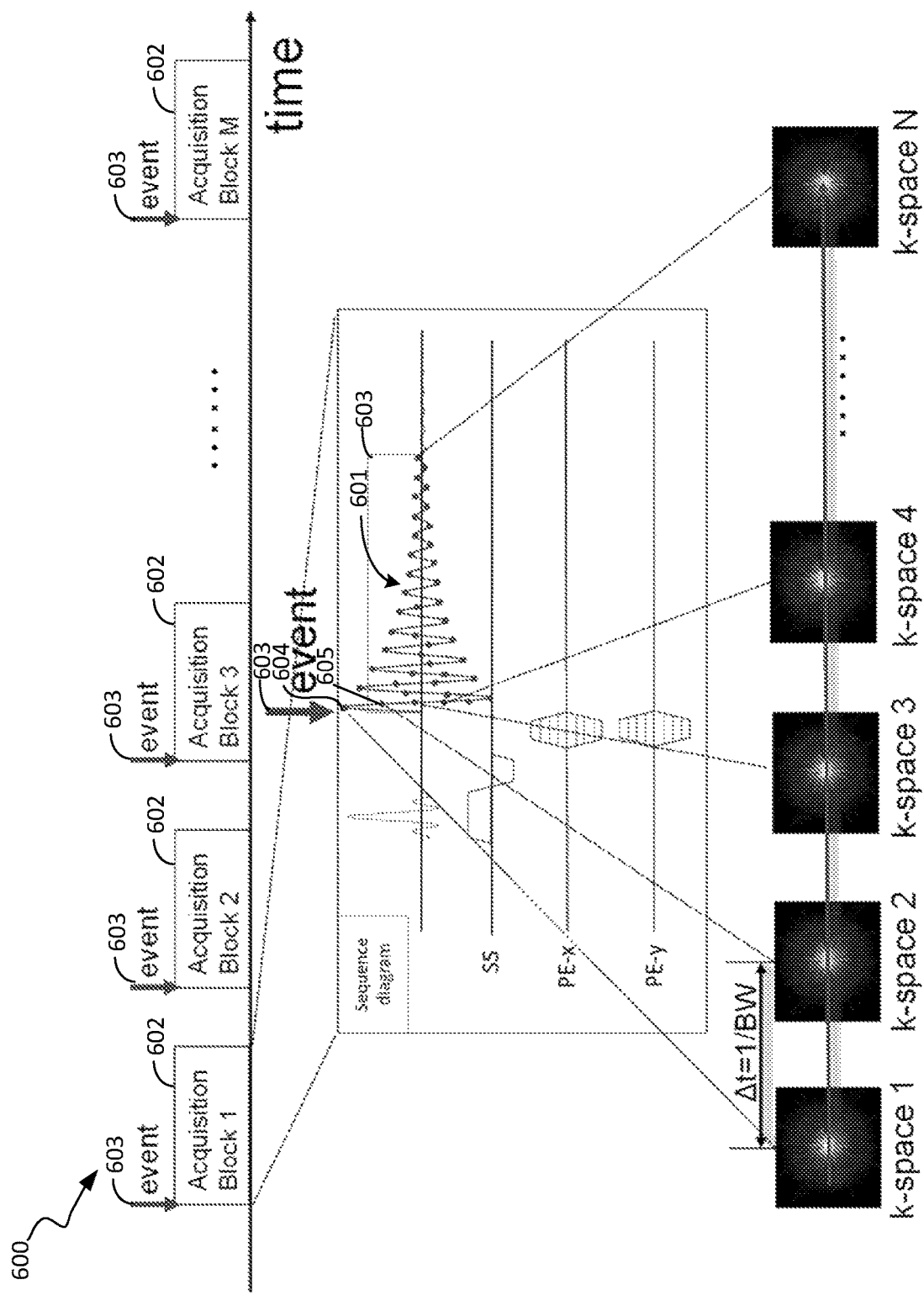
FIG. 6 illustrates an exemplary diagram of the principles of the present disclosure applied to a spin-echo pulse sequence
Figures 11A, 11B:
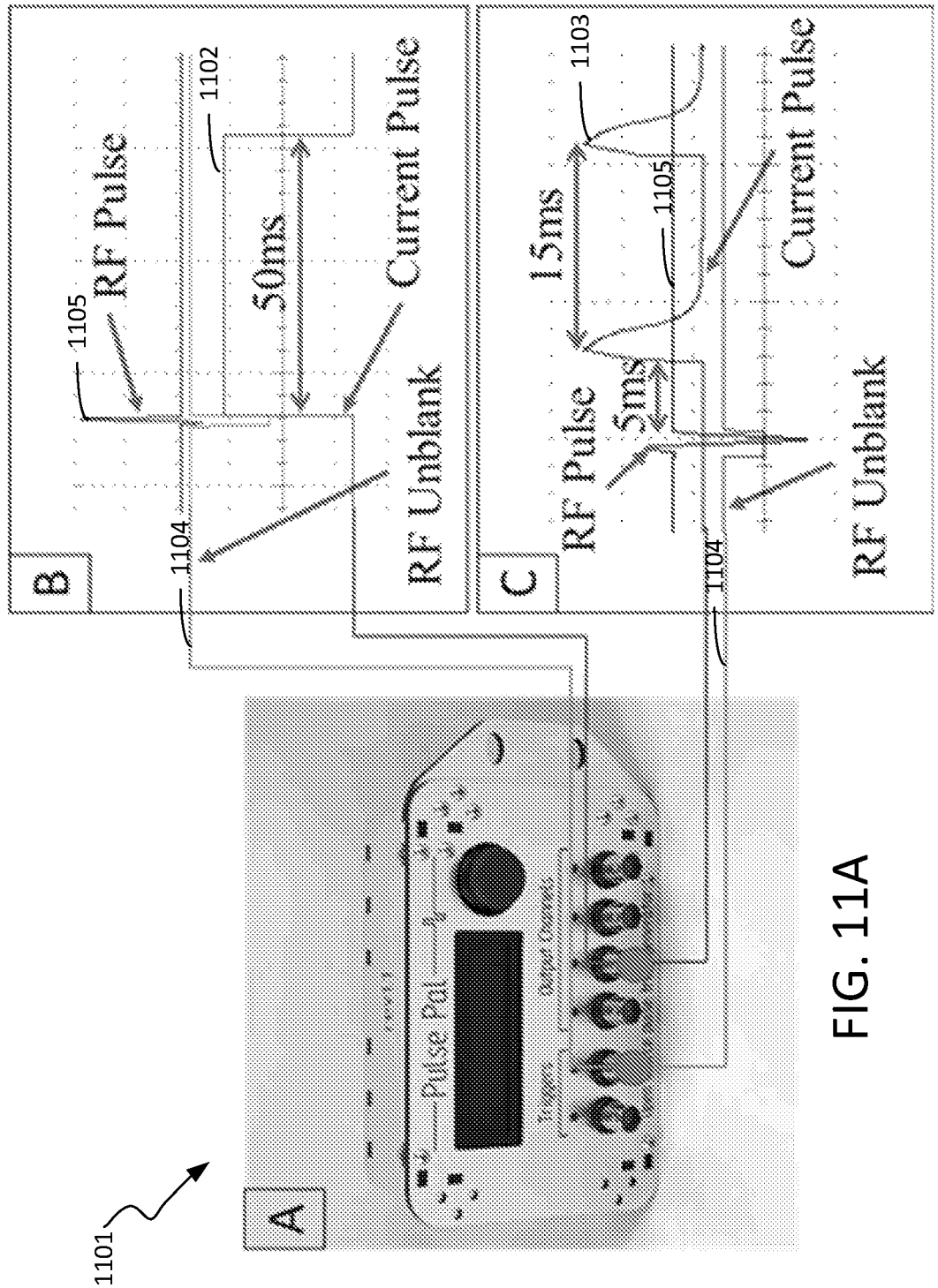
FIG. 11A shows a pulse generator and FIG. 11B shows a step waveform and an action-potential-like waveform generated using the pulse generator and captured on an oscilloscope while scanning.

A programmable pulse generator, PulsePal (Sanworks, Stony Brook, NY) (9), was used to deliver a current signal to the wire loop (FIG. 7A) in synchrony with a SPEEDI pulse sequence (FIG. 6). The latency of the triggered signal in Pulsepal was smaller than 100 µs, indicating the maximal temporal resolution that can be tested in experiment. FIG. 11A shows the PulsePal pulse generator 1101 and FIG. 11B shows the step waveform 1102 and the action-potential-like waveform 1103 generated using the pulse generator 1101 captured on an oscilloscope while scanning. Using the Pulsepal pulse generator 1101, the step current waveform 1102 was first programmed to demonstrate the synchronization of the triggered current pulse 1105 and the RF unblank signal 1104, followed by a custom designed current signal 1103 to imitate the action potential in brain neuron membrane using the known Hodgkin-Huxley model. The current signal 1103 generated from the Pulsepal pulse generator 1101 was triggered and synchronized by the RF unblank signal 1104 from the scanner. The step waveform 1102 showed precise alignment between the triggered pulse 1105 and the RF unblank signal 1104. The duration of each peak in the action-potential-like waveform 1103 was 5 ms, which was similar to a typical brain neuron action potential, with a 5 ms delay at the beginning of the waveform.

Computer Simulation

To determine the relationship between the applied current and the phase change, a computer simulation was also performed with a set of parameters identical to those used in the experimental studies described above. Using Eqs. 2 and 3, the simulated phase maps as well as the phase evolution at specific points were calculated, which established a benchmark for comparison with experimental results.

Image Reconstruction and Analysis

The image reconstruction and analysis were performed offline using customized Matlab programs (MathWorks, Inc., Natick, MA). Phase difference maps were first produced by taking the difference between the two adjacent acquisitions and compared with the simulation results. Reconstruction of phase maps from CS acquisition were performed with 20 iterations. The phase evolution at each point was also extracted and compared with the calculated phase evolution using Eqs. 2 and 3. To statistically determine the similarity between the two curves of the acquired and simulated phase evolution, Mean Square Error (MSE), Root MSE (RMSE) and correlation coefficient (r) were calculated using the following equations, $$MSE = \frac{1}{n}\sum(x_{acq} - x_{simu})^2 \quad (4)$$

$$RMSE = \sqrt{\frac{1}{n}\sum(x_{acq} - x_{simu})^2} \quad (5)$$

-continued $$r = \frac{1}{n}\sum \frac{(x_{acq} - \bar{x}_{acq}) \cdot (x_{simu} - \bar{x}_{simu})}{s_{acq} \cdot s_{simu}} \quad (6)$$

where n is the number of the samples, $x_{acq}$ is the acquired data, $x_{simu}$ is the simulation result, $\bar{x}_{acq}$ and $\bar{x}_{simu}$, $s_{acq}$ and $s_{simu}$ are the mean and standard deviation of $x_{acq}$ and $x_{simu}$, respectively.

Results

As indicated above, the step current waveform 1102 captured on an oscilloscope while scanning (FIG. 11B) showed precise alignment of the triggered current pulse 1105 and the RF unblank signal 1104 from the scanner, demonstrating that the event to be captured was well synchronized with the imaging sequence using the pulse generator in this study.

Figures 12A, 12B, 12C:
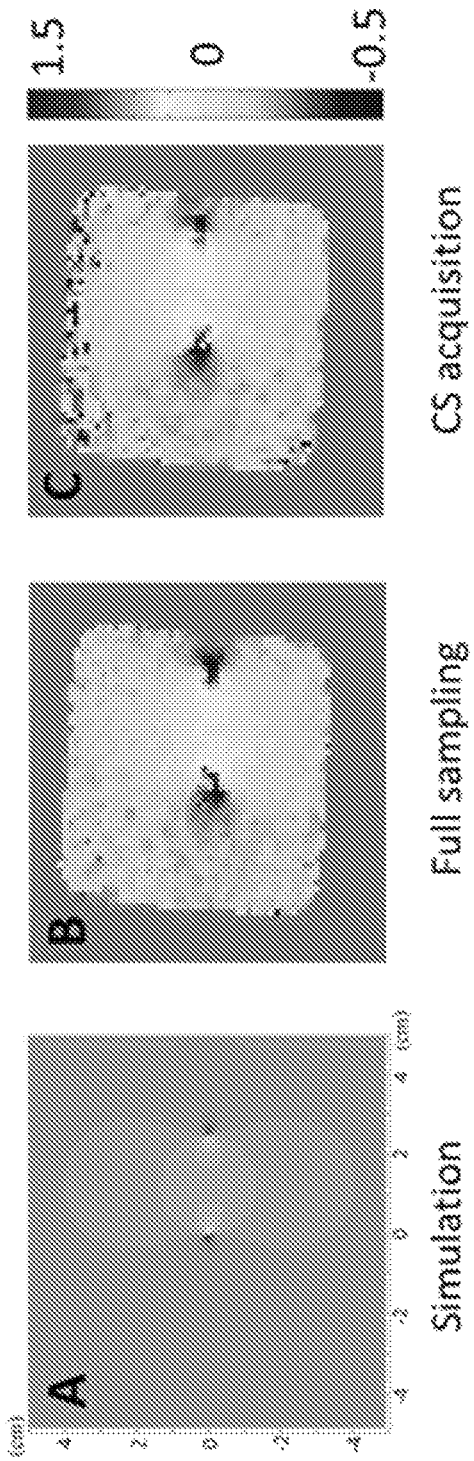
FIG. 12A shows a simulated acquired phase image at the middle plane of the two parallel wires of the wire loop shown in FIG. 7A with a current of 3 mA being passed through the wire loop.
FIG. 12B shows a fully-sampled phase map acquired when passing a current of 3 mA through the wire loop shown in FIG. 7A.
FIG. 12C shows a compressive sensing (CS)-sampled phase map acquired when passing a current of 3 mA through the wire loop shown in FIG. 7A.

FIG. 12A shows the simulated phase image at the middle plane of the two parallel wires (FIG. 7A) with a current of 3 mA, in which the dipole pattern is clearly visible. For the experimental study, both the fully-sampled phase map shown in FIG. 12B and the CS-acquired phase map shown in FIG. 12C were acquired at TE=20 ms. The phase maps from the experiment shown in FIGS. 12B and 12C matched well qualitatively and quantitatively with the phase map from the simulation shown in FIG. 12A, with the dipole pattern clearly shown. The CS-sampled phase map (FIG. 12C) showed similar quality as the fully-sampled phase map (FIG. 12B) with a reduced scan time of about 4 minutes, demonstrating the feasibility of SPEEDI to be combined with other advanced k-space sampling techniques.

Figure 13:
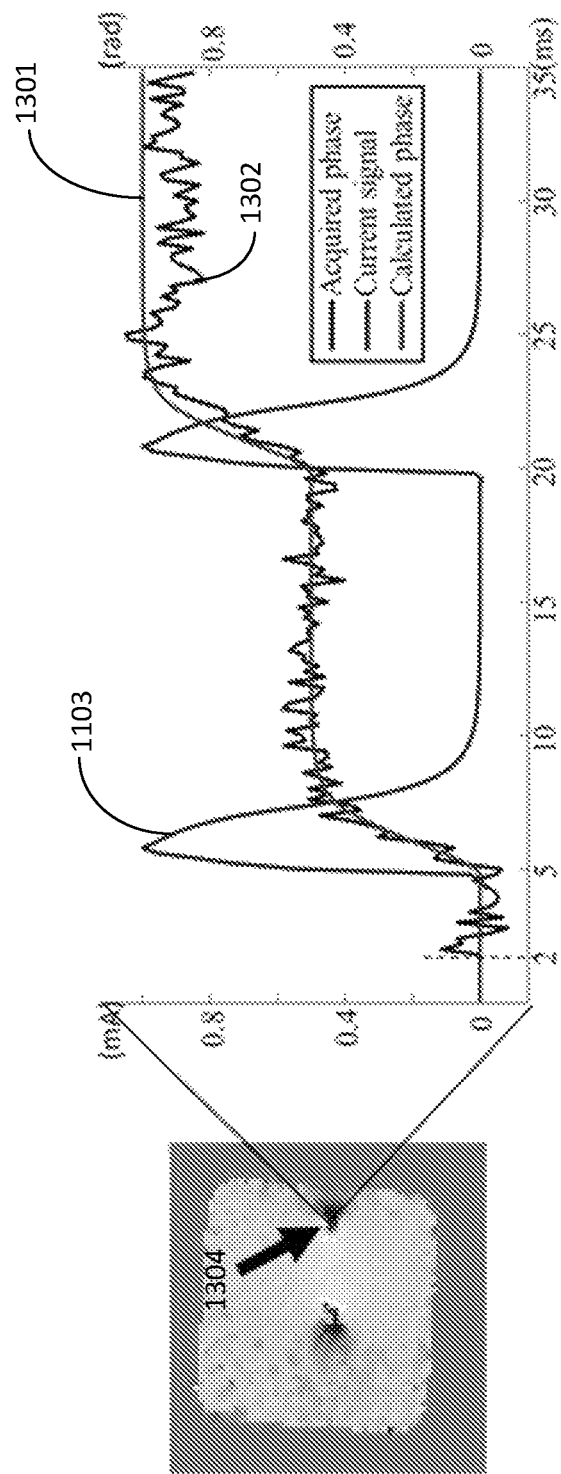
FIG. 13 is a normalized plot of the action-potential-like current signal shown in FIG. 11B, its calculated phase evolution and actual acquired phase data.

FIG. 13 is a normalized plot of the action-potential-like current signal 1103 (FIG. 11B), its phase evolution 1301 calculated using Eq. 3 and the actual acquired phase data 1302 from the arrowed point 1304. The total length of the input current was 35 ms, including a 5 ms delay at the beginning. The interval between the two peaks was 15 ms. The curve 1302 matched well with the simulated phase 1301. The MSE, RMSE and correlation coefficient of the simulated and acquired phase evolution curves 1301 and 1302, respectively, is 0.005, 0.071 and 0.981, respectively, indicating a significant, strong relationship and similarity of the two curves 1301 and 1302 (r>0.9). This result further demonstrated that the fast-changing current was captured using SPEEDI with a temporal resolution of 0.2 ms.

An example of the manner in which SPEEDI can be sued to capture the opening and closing of a human aortic valve will now be described with reference to FIGS. 14-19. Stenosis and regurgitation are two common valvular diseases currently diagnosed using echocardiography. Cardiac MR has potential to diagnose these two diseases, but conventional MRI systems and methods have inadequate temporal resolution for capturing the rapid opening or closing of aortic valve. The following example demonstrates the manner in which SPEEDI can be used to visualize this aortic process using MRI with sub-millisecond temporal resolution. This new capability has improved the accuracy and reliability in studying the dynamics of aortic valve, thereby providing new opportunities to detect stenosis and regurgitation using MRI.

Typically, the opening and closing of the aortic valve happen in less than 50 ms. Even with the highest temporal resolution available for cardiac MRI, only a few time points can be acquired during the dynamic process of aortic valve opening and closing. A variation of SPEEDI, referred to herein as echo-planar-imaging-SPEEDI (epi-SPEEDI) or echo-train-SPEEDI (et-SPEEDI), can be applied to capture the opening and closing of an aortic valve with sub-millisecond temporal resolution.

Figure 14:
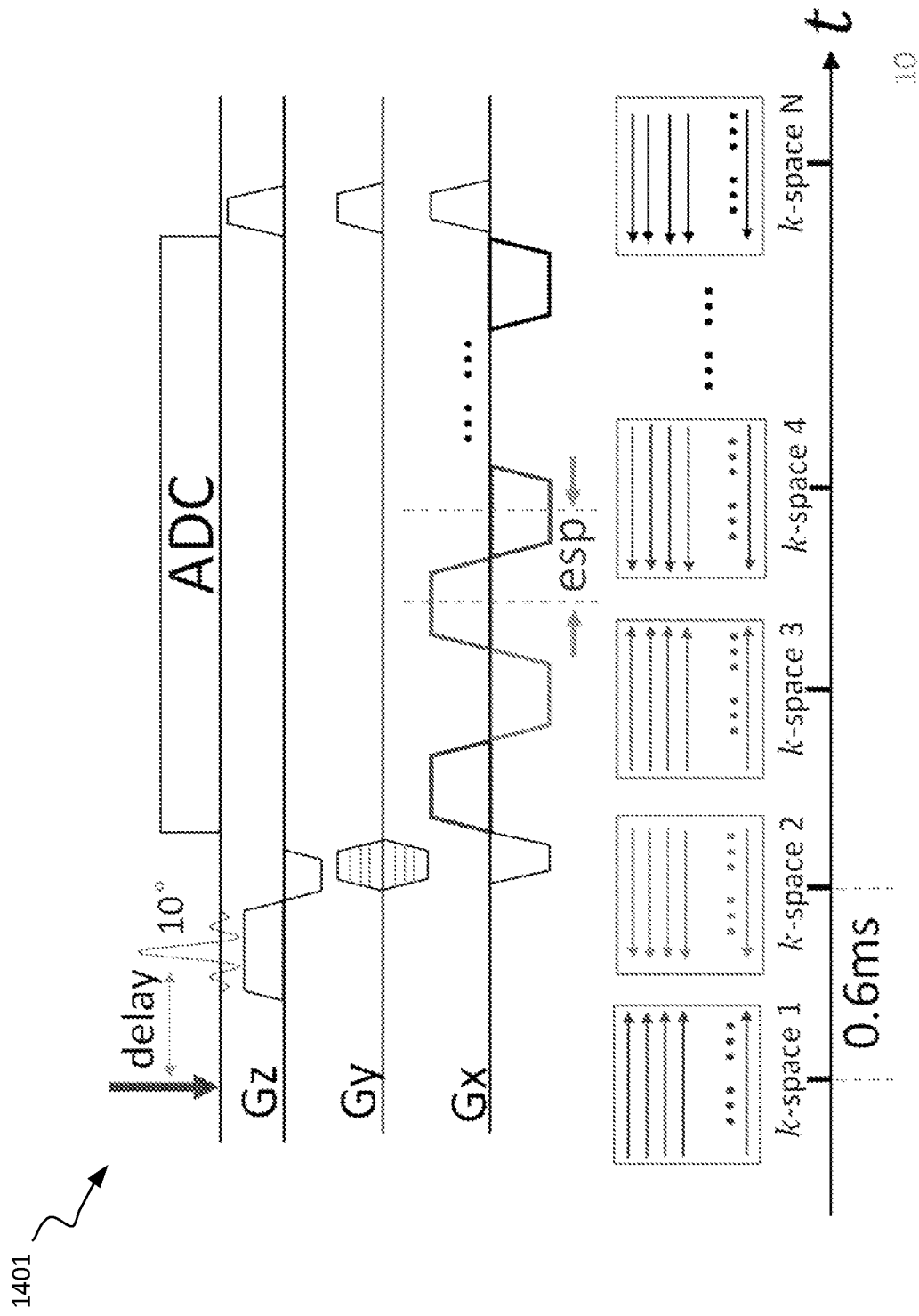
FIG. 14 is a sequence diagram illustrating the principles of echo-train-based data acquisition, or echo-planar-imaging-based variation of SPEEDI, in accordance with an exemplary embodiment.

Built upon SPEEDI, epi-SPEEDI extends the FID-based acquisition to an echo-train-based acquisition in a fashion similar to a non-phase-encoded EPI sequence. FIG. 14 is a sequence diagram 1401 illustrating the principles of epi-SPEEDI. The epi-SPEEDI sequence is synchronized with an ECG-trigger. Each echo in the echo train is positioned in an individual k-space matrix, and all echoes in the echo train are spread across a series of time-resolved k-space matrices (k-space 1, k-space 2, . . . k-space N). This process is repeated with different phase-encoding values until all 2-D k-space matrices are adequately sampled. After a 2-D Fourier transformation, a collection of images can be obtained, providing a time-resolved description of the dynamic process with a time resolution determined by echo spacing (esp). Using ramp sampling, a sub-millisecond temporal resolution can be achieved on commercial human scanners. Compared to SPEEDI, epi-SPEEDI substantially shortens the overall scan time at the expense of reduced temporal resolution. Although this demonstration is limited to 2-D, the same concept can be expanded to 3-D with an additional phase-encoded direction.

Figure 15:
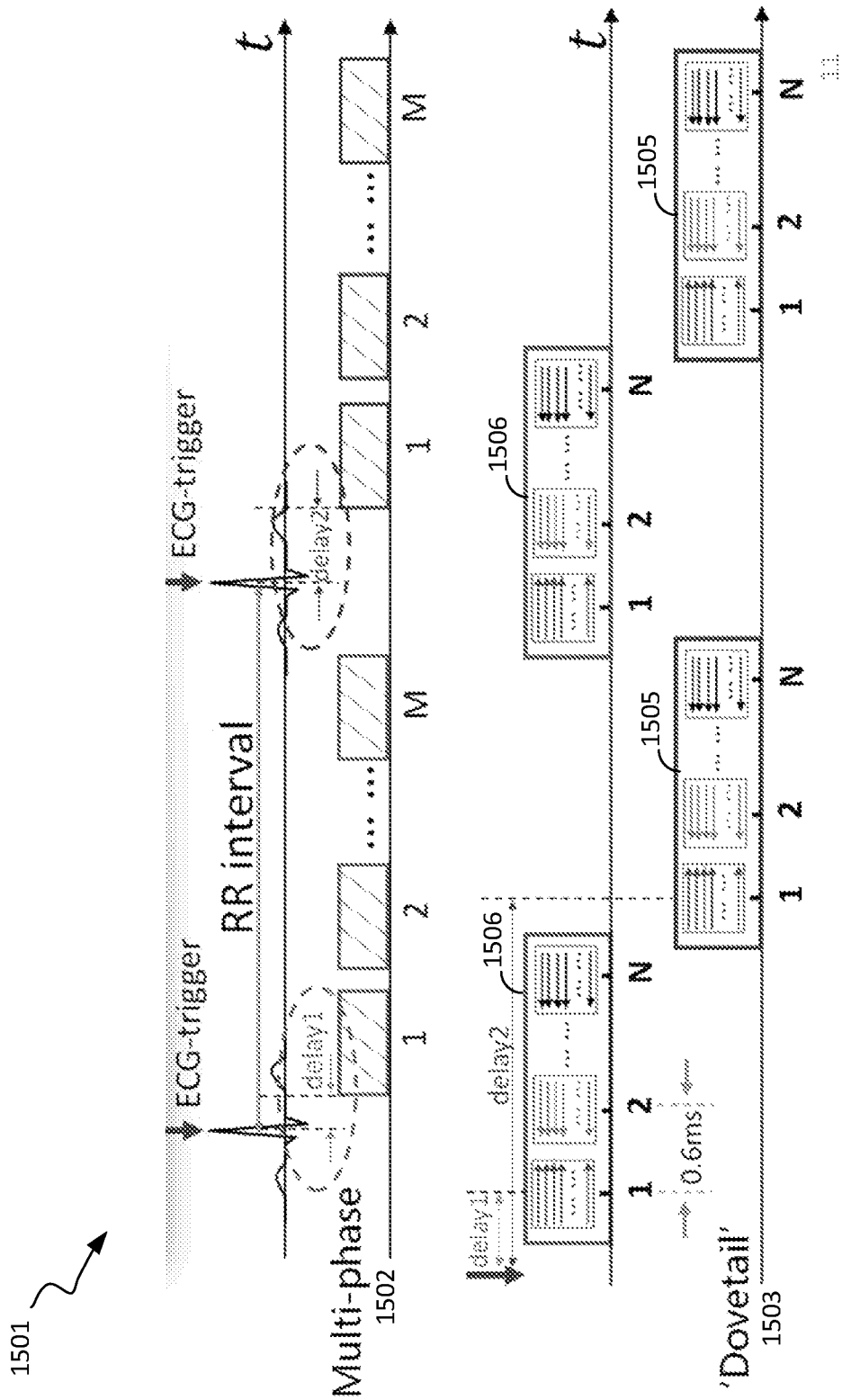
FIG. 15 is a sequence diagram illustrating use of a multi-phase acquisition process in combination with a "dovetail" acquisition process to cover an entire RR interval of an ECG signal.

In order to cover the entire RR interval in the ECG waveform, two acquisition strategies were used in this embodiment: multi-phase acquisition and "dovetail" acquisition. FIG. 15 is a sequence diagram 1501 illustrating the multi-phase acquisition strategy 1502 and the "dovetail" acquisition strategy 1503. With the multi-phase approach 1502, M blocks were acquired within the RR interval, with each block containing N images. With the "dovetail" acquisition strategy 1503, two different trigger delays were employed so that the blank time between the acquisition blocks can be "dovetailed." In doing so, the entire RR interval can be covered without any gap using 2*M*N images.

The multi-phase acquisition strategy 1502 was used to cover a longer time span, where each acquisition block was repeated immediately after the preceding acquisition block was finished. Due to the RF pulse and crusher gradients, a blank time was present between the acquisition blocks. To fill the blank time between acquisition blocks, the "dovetail" acquisition strategy 1503 was employed, where two different trigger delays were used. The acquisition blocks 1505 "dovetailed" the acquisition blocks 1506 to fill the blank time. The difference of two trigger delays enables elimination of the blank times.

The epi-SPEEDI sequence 1501 was implemented on a 3T GE MR750 scanner. Cardiac MR images were acquired from healthy human subjects. Short-axis view was selected for imaging the aortic valve to capture all of the three cuspids. The key sequence parameters were: slice thickness=8 mm, FOV=22 cm×22 cm, matrix=118×118, esp=0.6 ms, trigger delay=12 ms/22 ms, flip angel=10°, acquisition time=160 heart beats. The acquired k-space data were reconstructed offline using a customized Matlab program. The reconstructed images were then realigned according to their acquisition time based on the acquisition strategies described in above with reference to FIG. 15. The anatomical area of aortic valve (AOA) was calculated for each frame to monitor its dynamic change.

Results

Figure 16A:
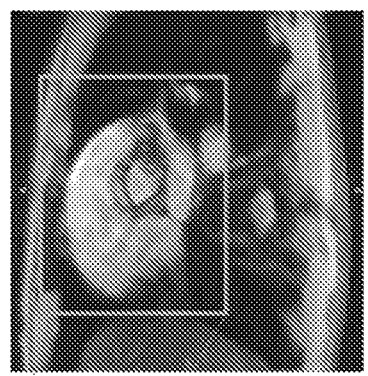
FIGS. 16A and 16B show sets of images captured using the combined acquisition process shown in FIG. 15 with a temporal resolution of 0.6 ms during the opening and closing of aortic valve, respectively.
Figure 16A:
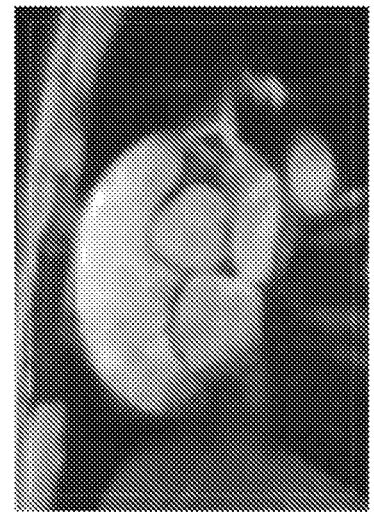
Figure 16A:
Figure 16B:
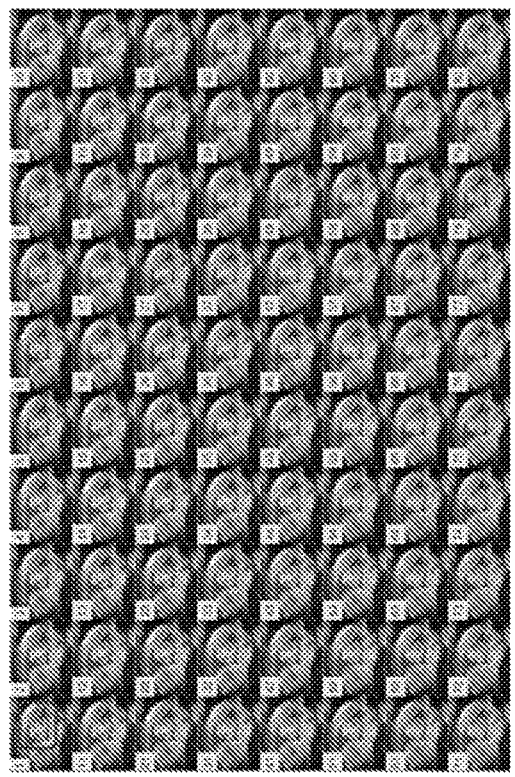
Figure 17:
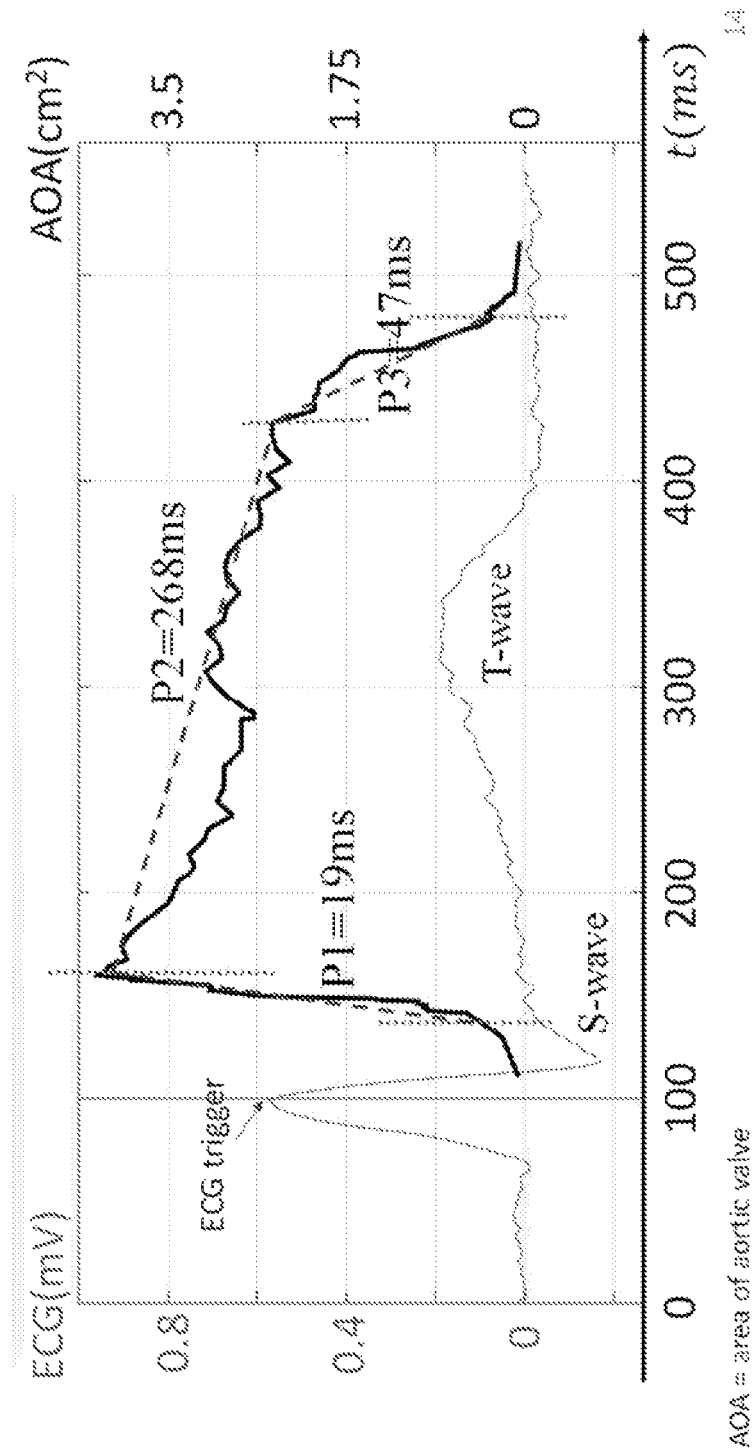
FIG. 17 is a plot of the anatomic area of aortic orifice in the time course that quantitively shows the opening and closing process of an aortic valve.

FIGS. 16A and 16B show sets of images captured using the epi-SPEEDI sequence 1501 with a temporal resolution of 0.6 ms during the opening and closing of aortic valve, respectively. The dynamics of the opening and closing process of aortic valve were clearly observed. FIG. 17 is a plot of the anatomic area of aortic orifice in the time course that quantitively shows the opening and closing process of aortic valve. The opening process started immediately after the QRS-complex, whereas the closing process ended after the T-wave, both of which matched well with the ECG waveform. The three phases of the entire process of aortic valve opening and closing were also well identified in FIG. 17: a rapid opening phase (P1=19 ms), a slowly closing phase (P2=268 ms), and a rapid closing phase (P3=47 ms).

DISCUSSION AND CONCLUSION

Esp-SPEEDI was used to capture the dynamics of the opening and closing of human aortic valve with a temporal resolution of 0.6 ms. This further demonstrates the capability of SPEEDI for capturing ultra-fast biological processes, including, but not limited to, ultra-fast physiologic processes such as an aortic valve opening and closing, for example. The three phases during the opening and closing process of the aortic valve have been demonstrated in previous studies using echocardiography on the human heart, as well as on mouse heart using MRI. In the animal studies, the inferior temporal resolution to what was achieved using esp-SPEEDI can lead to overestimation of the rapidly opening process and underestimation of the slowly closing process. Using epi-SPEEDI with sub-millisecond temporal resolution, the dynamic process of aortic valve opening and closing can be more accurately and reliably visualized, thereby paving the way for epi-SPEEDI to be applied to patients with aortic valve dysfunctions.

It should be noted that many modifications may be made to the manner in which SPEEDI and esp-SPEEDI are performed, as will be understood by those of skill in the art in view of the description provided herein. In addition, SPEEDI can be combined with many advanced MRI acquisition techniques other than the CS acquisition technique, such as the SENSE, the GRAPPA, and the simultaneous multi-slice (SMS) acquisition techniques, for example, which will further improve the performance of SPEEDI and esp-SPEEDI. It should also be noted that SPEEDI and esp-SPEEDI are not limited to capturing events of the type described herein, but can be used to capture more complex rapid physical and biological processes such as neuronal currents, other cardiac movements, etc., providing that the event is cyclic or repeating. With SPEEDI and esp-SPEEDI, new insights may be brought into a number of fields through capturing rapidly changing processes in vitro or in vivo that were inaccessible before due to the limited temporal resolution of MRI.

In the studies described above, efforts were directed toward achieving the highest possible temporal resolution that is determined by the receiver bandwidth. Some physical or biological events, however, do not require an exceedingly high temporal resolution. A number of strategies can be used to make SPEEDI and esp-SPEEDI adaptive to a range of temporal resolutions needed for a specific application. First, a narrow receiver bandwidth can be used to intentionally reduce the temporal resolution. Second, a broad receiver bandwidth can be used in combination with averaging the neighboring time points in the signal to intentionally degrade the temporal resolution and achieve a higher signal-to-noise ratio. For example, if a receiver bandwidth of +/−10 kHz is used, the nominal temporal resolution would be 50 μs. If a piece-wise average of every 8 time points is performed, then the resulting temporal resolution will become 400 μs with a higher signal-to-noise ratio in each frame (albeit blurred temporally). Third, the piece-wise temporal segments (e.g., every 16 points) can be used to incorporate spatial encoding, thereby reducing the required phase-encoding steps and consequently the overall scan time. This approach can also be used to trade the temporal resolution for spatial resolution. The above three strategies are examples, and other strategies also exist, as will be understood by those of skill in the art in view of the description provided herein.

Figure 18:
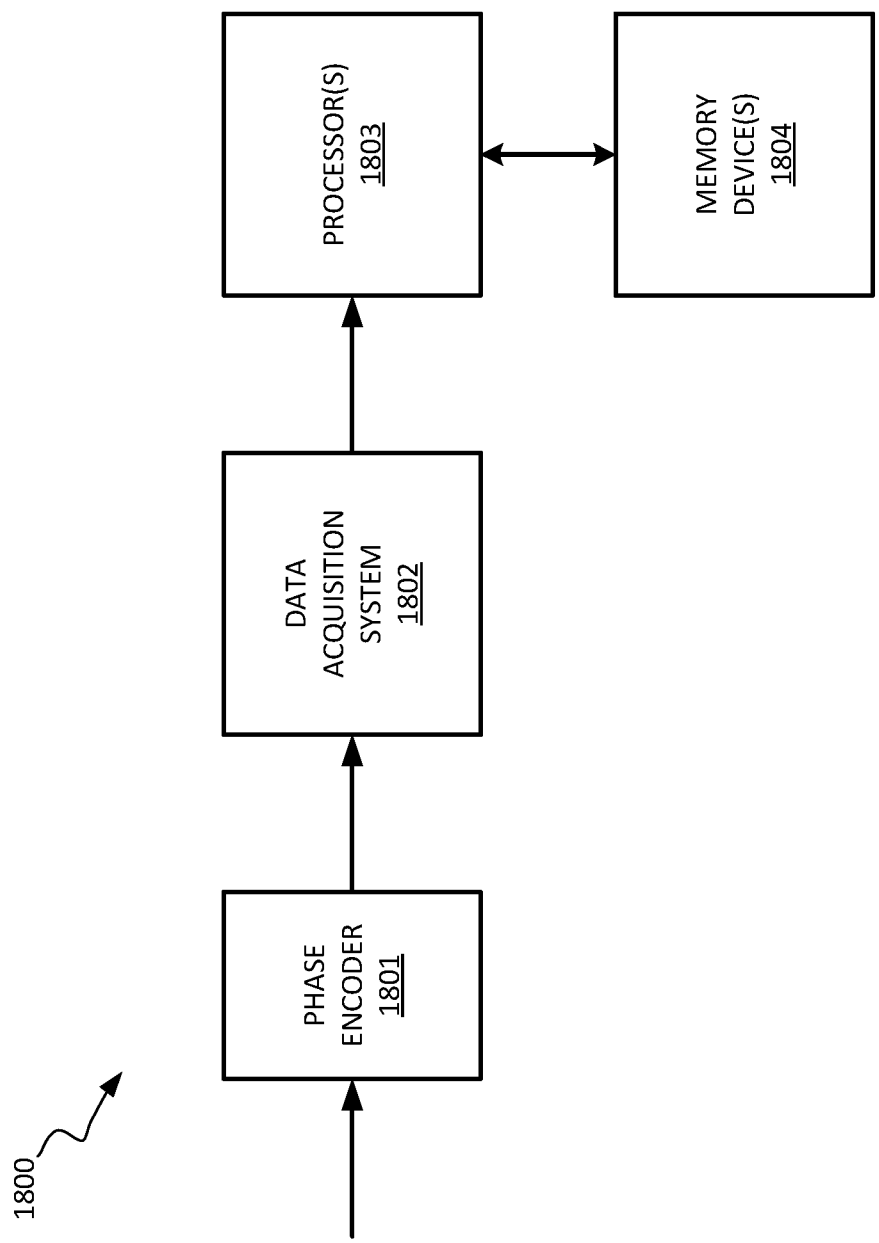
FIG. 18 illustrates a system in accordance with an exemplary embodiment, each of the components of the system constructed in accordance with the principles disclosed herein.

FIG. 18 is a block diagram of the SPEEDI system or epi-SPEEDI system 1800 in accordance with an exemplary embodiment for performing the methods disclosed herein. The system 1800 may be incorporated into the MRI system shown in FIG. 1, for example. A phase encoder 1801 of the system 1800 phase-encodes the MRI signal with spatial information to produce a phase-encoded signal. The MRI signal may be any one of an FID signal, a spin-echo signal, a stimulated echo signal, a train of FID signals, a train of gradient-echo signals, a train of spin-echo signals and a train of stimulated echo signals. The phase encoder 1801 may be, for example, a pulse generator such as the pulse generator 121 shown in FIG. 1. The phase encoder 1801 manipulates the phase of the MRI signal to perform phase encoding. As indicated above, typically, Gy is the phase-encoding gradient, but in the context of the present disclosure, any one, any two, or all three gradients (Gx, Gy and Gz) can be the phase-encoding gradient(s).

A data acquisition system 1802 of the system 1800 performs one of the data acquisition processes described above with reference to FIG. 2, 6, 14 or 15 that samples the phase-encoded MRI signal at N instants in time in each of M data acquisition windows to generate k-space data matrix with L data points. Each k-space data matrix can be reconstructed to an image that corresponds to a respective point in time on the MRI signal, where M, N and L are positive integers that are greater than or equal to two. As described above, each data acquisition window is synchronized to the cyclic event. A processor 1803 is configured to process the phase-encoded k-space data matrix to produce a reconstructed MR image of the cyclic event. The processor 1803 may be, for example, image processor 106 shown in FIG. 1 and/or array processor 160 shown in FIG. 1. It should be noted that the links between the components shown in FIG. 18 may be wired or wireless links.

Figure 19:
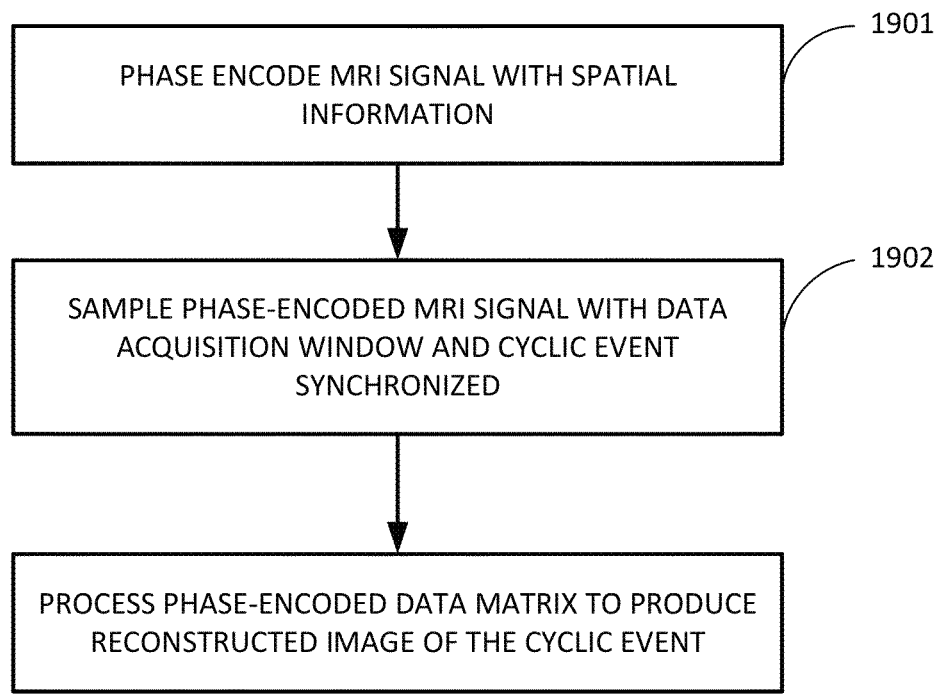
FIG. 19 is a flow diagram that represents the method in accordance with an exemplary embodiment.

FIG. 19 is a flow diagram that represents the method in accordance with an exemplary embodiment. The MRI signal is phase encoded with spatial information to produce a phase-encoded signal, as indicated by block 1901. Data acquisition is then performed during which the phase-encoded MRI signal is sampled at N instants in time in each of M data acquisition windows to generate L data points in a k-space matrix, each corresponding to a respective phase-encoded image, as indicated by block 1902. As described above, each data acquisition window is synchronized to the cyclic event. Each of the phase-encoded k-space data matrix is then processed to produce a reconstructed MR image of the cyclic event.

Throughout this specification, plural instances may implement components, operations, or structures described as a single instance. Although individual operations of one or more methods are illustrated and described as separate operations, one or more of the individual operations may be performed concurrently and, aside from prerequisite data flow, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations. Though the application describes image processors coupled to memory devices storing routines, any such processor/memory device pairing may instead be implemented in the system by dedicated hardware permanently (as in an ASIC) or semi-permanently (as in an FPGA) programmed to perform the routines.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms performing operations on data stored as bits or binary digital signals within a machine memory (e.g., a computer memory). As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof", are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system for purposes of illustration only. One skilled in the art will readily recognize from the description that alternative embodiments of the structures and methods illustrated herein may be employed without departing from the principles described herein.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein.

Various modifications, changes and variations, which will be apparent to those skilled in the art, may be made in the arrangement, operation and details of the method and apparatus disclosed herein without departing from the spirit and scope defined in the appended claims.

It should be noted that any or all portions of algorithms described above that are implemented in software and/or firmware being executed by a processor (e.g., processor 1803) can be stored in a non-transitory memory device, such as the memory 1804. For any component discussed herein that is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages. The term "executable" means a program file that is in a form that can ultimately be run by the processor 1803. Examples of executable programs may be, for example, a compiled program that can be translated into machine code in a format that can be loaded into a random access portion of the memory 1804 and run by the processor 1803, source code that may be expressed in proper format such as object code that is capable of being loaded into a random access portion of the memory 1804 and executed by the processor 1803, or source code that may be interpreted by another executable program to generate instructions in a random access portion of the memory 1804 to be executed by the processor 1803, etc. An executable program may be stored in any portion or component of the memory 1804 including, for example, random access memory (RAM), read-only memory (ROM), hard drive, solid-state drive, USB flash drive, memory card, optical disc such as compact disc (CD) or digital versatile disc (DVD), floppy disk, magnetic tape, static random access memory (SRAM), dynamic random access memory (DRAM), magnetic random access memory (MRAM), a programmable read-only memory (PROM), an erasable programmable read-only memory (EPROM), an electrically erasable programmable read-only memory (EEPROM), or other like memory device.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A method for acquiring a magnetic resonance imaging (MRI) signal of a cyclic event and for reconstructing a magnetic resonance (MR) image of the cyclic event with high temporal resolution, the method comprising:
   phase encoding spatial information into an MRI signal to produce a phase-encoded MRI signal by manipulating a phase of the MRI signal within an MRI system;
   performing a data acquisition process in the MRI system that samples the phase-encoded MRI signal at N instants in time in each of M data acquisition windows to generate N matrices, each matrix comprising a phase-encoded raw data set that corresponds to a respective point in time on the MRI signal, each phase-encoded raw data set comprising L raw data set points, where M, N and L are positive integers that are greater than or equal to two, each data acquisition window being synchronized to the cyclic event; and
   processing each of the N phase-encoded raw data sets to produce a series of N reconstructed MR images of the cyclic event.

2. A method for producing a series of time-resolved magnetic resonance (MR) images comprising:
   encoding spatial information into a magnetic resonance imaging (MRI) signal by manipulating a phase of the MRI signal within an MRI system;
   generating and outputting a phase-encoded MRI signal over time by digitizing a plurality of time points in the MRI signal;
   using the MRI system, repeating the generating and outputting step for a plurality of phase-encoded signals, each phase-encoded signal in synchrony with a trigger and each phase-encoded signal incorporating a distinctive or identical phase-encoding value and producing a plurality of digitized time points; and
   reconstructing a series of time-resolved MR images, each image of the series of time-resolved MR images at one specific time point selected from the plurality of digitized time points for each phase-encoded signal, by utilizing phase-encoded data acquired from the output of the plurality of phase-encoded signals, each image in the series of time-resolved MR images corresponding to a specific time point in the cyclic event.

3. A system for reconstructing a magnetic resonance (MR) image of a cyclic event with high temporal resolution, the system comprising:
   a phase encoder configured to phase encode spatial information into a magnetic resonance imaging (MRI) signal to produce a phase-encoded MRI signal by manipulating a phase of the MRI signal;
   a data acquisition system that performs a data acquisition process that samples the phase-encoded MRI signal at N instants in time in each of M data acquisition windows to generate N matrices, each matrix comprising a phase-encoded raw data set that corresponds to a respective point in time on the MRI signal, where M and N are positive integers that are greater than or equal to two, each data acquisition window being synchronized to the cyclic event; and
   a processor configured to process the phase-encoded raw data set to produce a reconstructed MR image of the cyclic event.

4. A system for reconstructing a magnetic resonance (MR) image of a cyclic event with high temporal resolution, the system comprising:
   a phase encoder configured to phase encode spatial information into a magnetic resonance imaging (MRI) signal to produce a phase-encoded MRI signal by manipulating a phase of the MRI signal, the MRI signal comprising a train of echoes of one of a free-induction decay (FID) signal, a gradient-echo signal, a spin-echo signal and a stimulated echo signal;

a data acquisition system that performs an echo-train-based data acquisition process that samples the train of echoes such that each echo in the train of echoes is positioned in a respective time-resolved two-dimensional (2-D) k-space matrix and such that all echoes of the train of echoes are spread across a series of the time-resolved 2-D k-space matrices, the echo-train-based data acquisition process being repeated with different phase-encoding values applied by the phase encoder to the MRI signal to produce the phase-encoded MRI signal until all of the time-resolved 2-D k-space matrices are adequately sampled; and a processor configured to process the series of 2-D k-space matrices to produce a reconstructed MR image of the cyclic event with a temporal resolution determined by an inter-echo spacing between two adjacent echoes of the train of echoes.

5. The method of claim 1, further comprising:
displaying a reconstructed MR image on a display device.

6. The method of claim 1, wherein the series of N reconstructed MR images has a temporal resolution that is less than or equal to one millisecond.

7. The method of claim 6, wherein each matrix is a k-space matrix comprising L k-space points.

8. The method of claim 1, wherein the MRI signal is one of a free-induction decay (FID) signal, a spin-echo signal, a stimulated echo signal, a train of FID signals, a train of gradient-echo signals, a train of spin-echo signals and a train of stimulated echo signals.

9. The method of claim 8, wherein the temporal resolution is based on a dwell time, $\Delta t$, of the data acquisition process, and wherein the dwell time is inversely related to a bandwidth, BW, of the MRI system as 1/BW.

10. The method of claim 1, wherein the step of processing the phase-encoded raw data sets to produce a reconstructed MR image of the cyclic event includes performing a phase evolution algorithm that processes phase-encoded images to produce phase maps corresponding to respective phase-encoded raw data sets and takes differences between the phase maps to obtain a time-resolved phase evolution of the cyclic event.

11. The method of claim 1, wherein the cyclic event is physical, chemical, biological, physiological, or metabolic in nature.

12. The method of claim 11, wherein the cyclic event is an aortic valve opening and closing.

13. The method of claim 2, wherein the series of time-resolved MR images span a fraction of a cycle, a full cycle or a plurality of cycles in the cyclic event.

14. The method of claim 2, wherein the cyclic event is physical, chemical, biological, physiological, or metabolic in nature.

15. The method of claim 2, wherein manipulation of the MRI signal phase is performed by a phase-encoding gradient pulse or a non-linear gradient applied prior to the acquisition of the MRI signal.

16. The method of claim 2, wherein the image reconstruction is performed by using an inverse Fourier transform or other image reconstruction technique on the plurality of phase-encoded signals, all of which are acquired at the same digitized time point from within each phase-encoded MRI signal.

17. The method of claim 2, wherein the plurality of phase-encoded signals are substantially reduced by utilizing parallel imaging reconstruction or compressive sensing image reconstruction.

18. The method of claim 2, wherein the MRI signal is one of a free-induction decay (FID) signal, a spin-echo signal, a stimulated echo signal, a train of FID signals, a train of gradient-echo signals, a train of spin-echo signals and a train of stimulated echo signals.

19. The system of claim 3, wherein the MRI signal is one of a free-induction decay (FID) signal, a spin-echo signal, a stimulated echo signal, a train of FID signals, a train of gradient-echo signals, a train of spin-echo signals and a train of stimulated echo signals.

20. The system of claim 19, wherein the reconstructed MR image has a temporal resolution that is less than or equal to one millisecond.

* * * * *